(12) United States Patent　(10) Patent No.: US 8,572,484 B2
Maruyama et al.　(45) Date of Patent: Oct. 29, 2013

(54) DISPLAYING PLURAL PAGES OF DOCUMENT IN PREVIEW PRESENTATION

(75) Inventors: Miyoko Maruyama, Osaka (JP); Kumiko Ogino, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 21 days.

(21) Appl. No.: 13/206,854

(22) Filed: Aug. 10, 2011

(65) Prior Publication Data

US 2012/0050800 A1　Mar. 1, 2012

(30) Foreign Application Priority Data

Aug. 25, 2010　(JP) ................................ 2010-188540

(51) Int. Cl.
 *G06F 17/00*　(2006.01)
(52) U.S. Cl.
 USPC ........................................ 715/274; 358/1.16
(58) Field of Classification Search
 USPC ................... 358/1.15, 1.16; 715/274
 See application file for complete search history.

(56) References Cited

U.S. PATENT DOCUMENTS

| | | | |
|---|---|---|---|
| 8,274,719 B2 * | 9/2012 | Tomomatsu | 358/527 |
| 2004/0205641 A1 * | 10/2004 | Shimizu | 715/527 |
| 2006/0275028 A1 * | 12/2006 | Lee et al. | 396/287 |
| 2009/0086277 A1 * | 4/2009 | Cheshire et al. | 358/402 |
| 2009/0237712 A1 * | 9/2009 | Shirai | 358/1.15 |
| 2009/0265625 A1 * | 10/2009 | Tamai et al. | 715/274 |
| 2009/0273802 A1 * | 11/2009 | Kajiyama | 358/1.15 |
| 2010/0118338 A1 | 5/2010 | Sakiyama et al. | |

FOREIGN PATENT DOCUMENTS

| | | |
|---|---|---|
| JP | 2004-287042 | 10/2004 |
| JP | 2005-303488 | 10/2005 |
| JP | 2007-150556 | 6/2007 |
| JP | 2007-336015 | 12/2007 |
| JP | 2008-306469 A | 12/2008 |
| JP | 2010-118991 | 5/2010 |
| JP | 2010-147578 | 7/2010 |
| JP | 2010-171780 A | 8/2010 |
| JP | 2010-220007 | 9/2010 |

OTHER PUBLICATIONS

MS Word 2003.*

* cited by examiner

*Primary Examiner* — Eric A Rust
(74) *Attorney, Agent, or Firm* — Edwards Wildman Palmer LLP; George W. Neuner

(57) ABSTRACT

An image forming apparatus includes a document reader, a storage for storing image data, a display image generator for generating a display image, a display panel and a control unit-side controller for providing preview display of display images on a display panel, based on the image data input from the document reader. The control unit-side controller includes a document sheaf display controller, a small-sized image preparation controller, a small-sized image display controller, a folder preparation controller, a folder storage controller and a folder display controller.

3 Claims, 28 Drawing Sheets

DISPLAYING PLURAL PAGES OF DOCUMENT IN PREVIEW PRESENTATION

This Nonprovisional application claims priority under 35 U.S.C. §119 (a) on Patent Application No. 2010-188540 filed in Japan on 25 Aug. 2010, the entire contents of which are hereby incorporated by reference.

BACKGROUND OF THE INVENTION (1) Field of the Invention

The present invention relates to an image forming apparatus such as a copier, printer, facsimile machine or the like, in particular, relating to an image forming apparatus equipped with an image display control device capable of displaying plural pages of document images in preview representation.

(2) Description of the Prior Art

Recently, there have been known image forming apparatus that include an image display control device capable of providing a plurality of pages of document images in a preview representation. In such an image forming apparatus, the processed result of scanned (pre-scanned) documents is displayed in a preview representation on the display screen before job execution, so that it is possible to confirm the scanned documents before output.

In the prior art, there has been a disclosed configuration of an image forming apparatus including a preview display function of displaying preview of output images, which includes: a first entry means for entering a forward jump command; and a second entry means for entering a rearward jump command; a means for changing preview display to the front page of the previous image scanning step from the scanning step to which the currently preview-displayed page belongs when a forward jump command is input through the first entry means; and a means for changing preview display to the front page of the subsequent image scanning step from the scanning step to which the currently preview-displayed page belongs when a rearward jump command is input through the second entry means (see Patent Document 1: Japanese Patent Application Laid-open 2008-306469).

According to the above image forming apparatus, when document images have been read by the successive scanning copy function, an operation of the forward jump button or rearward jump button enables the preview display of the document sheaf currently displayed to quickly change to the preview display of the document sheaf that has been captured before or after the current one. According to the technology described in Patent Document 1, it is possible to handle and check the document images for each sheaf of documents. However, since it is difficult to check the correlation between document sheave, there is the problem that the overall picture of the scanned documents cannot be easily obtained.

Further, since it is necessary to change the display every time a different document sheaf is checked when the documents are checked by each document sheaf as the unit, there is a fear of causing the user to feel troublesome.

SUMMARY OF THE INVENTION

The present invention has been devised in view of the above prior art problems, it is therefore an object of the present invention to provide an image forming apparatus that enables the user to check the content of each sheaf of documents and correlation between document sheaves and also easily grasp the overall picture of the scanned documents without switching the display screen capable of providing preview display of the display images of the scanned sheaves of documents.

The first aspect of the invention resides in an image forming apparatus comprising: an input unit receiving input of image data; a storing unit storing the image data input from the input unit; a display image generator generating a display image based on the image data stored in the storing unit; a display portion having a display screen for displaying the display image generated by the display image generator; and, a display controller having a function of providing preview display of the display image on the display portion, based on the image data input from the input unit, and is characterized in that the input unit has a function of receiving additional input of image data; the display image generator has a function of separately generating a first display image based on precedent image data input before additional input and stored in the storing unit and a second display image based on additional image data that is additionally input; and, the display controller has a function of providing preview display of the first display image and the second display image, on the same display screen of the display portion, in a distinctive manner.

The second aspect of the present invention resides in that the settings when the additional image data is input are different from the settings when the precedent image data is input.

The above settings include settings for output, e.g., output image size, layout, paper size, presence/absence of a binding process, the binding position and the like.

The third aspect of the present invention resides in that the display controller has a function of displaying the second display image in an overlapping manner behind the first display image.

The fourth aspect of the present invention resides in that the display controller has a function of displaying the second display image in an overlapping manner in front of the first display image.

The fifth aspect of the present invention resides in that the display controller has a function of reducing the first display image in size and displaying it in an overlapping manner behind the second display image.

The sixth aspect of the present invention resides in that the display controller has a function of preparing the first display image that is reduced in size as a first small-sized image picture and a function of displaying the first small-sized image picture around the second display image that is given in a preview representation on the display screen of the display portion.

Here, the small-sized image picture may be one obtained by reducing the display image in size to a distinguishable degree, or may be a so-called icon using pictorial and text representation.

The seventh aspect of the present invention resides in that the display controller has a function of preparing a folder for storing the first display image, a function of storing the first display image in the folder, and a function of displaying the folder around the second display image that is given in a preview representation on the display screen of the display portion.

According to the first aspect of the present invention, it is possible for the user to check the content of each display image and correlation between display images without switching the display screen of the display portion and hence readily grasp the overall picture of the input image data.

According to the second aspect of the present invention, it is possible for the user to check the content of display images having different settings and correlation between display images without switching the display screen of the display portion and hence readily grasp the overall picture of the input image data.

According to the third aspect of the present invention, the input image data is displayed in order from the top, it is hence possible for the user to readily check display images.

According to the fourth aspect of the present invention, the latest display image is always displayed fore-most so that the user can readily check display images.

According to the fifth aspect of the present invention, it is possible to readily distinguish the latest display image from the other display images.

According to the sixth aspect of the present invention, it is possible to readily distinguish the latest display image from the other display images.

According to the seventh aspect of the present invention, since those other than the latest image are displayed in an integrated area, the display screen of the display portion can be adapted to easy to see.

DESCRIPTION OF THE PREFERRED EMBODIMENTS

The embodiment of the present invention will hereinafter be described with reference to the accompanying drawings.

Figure 1:
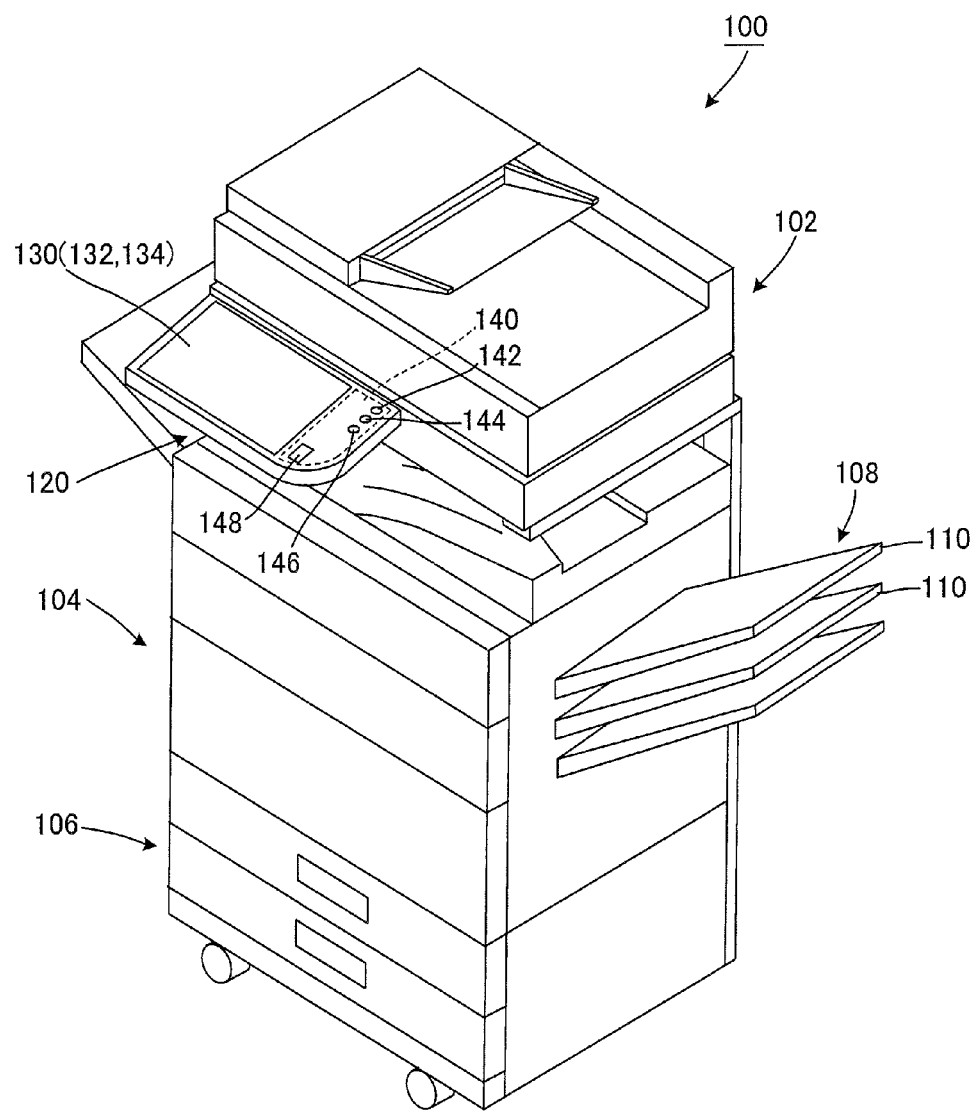
FIG. 1 is an illustrative view showing an overall configuration of an image forming apparatus according to the embodiment of the present invention.
Figure 2:
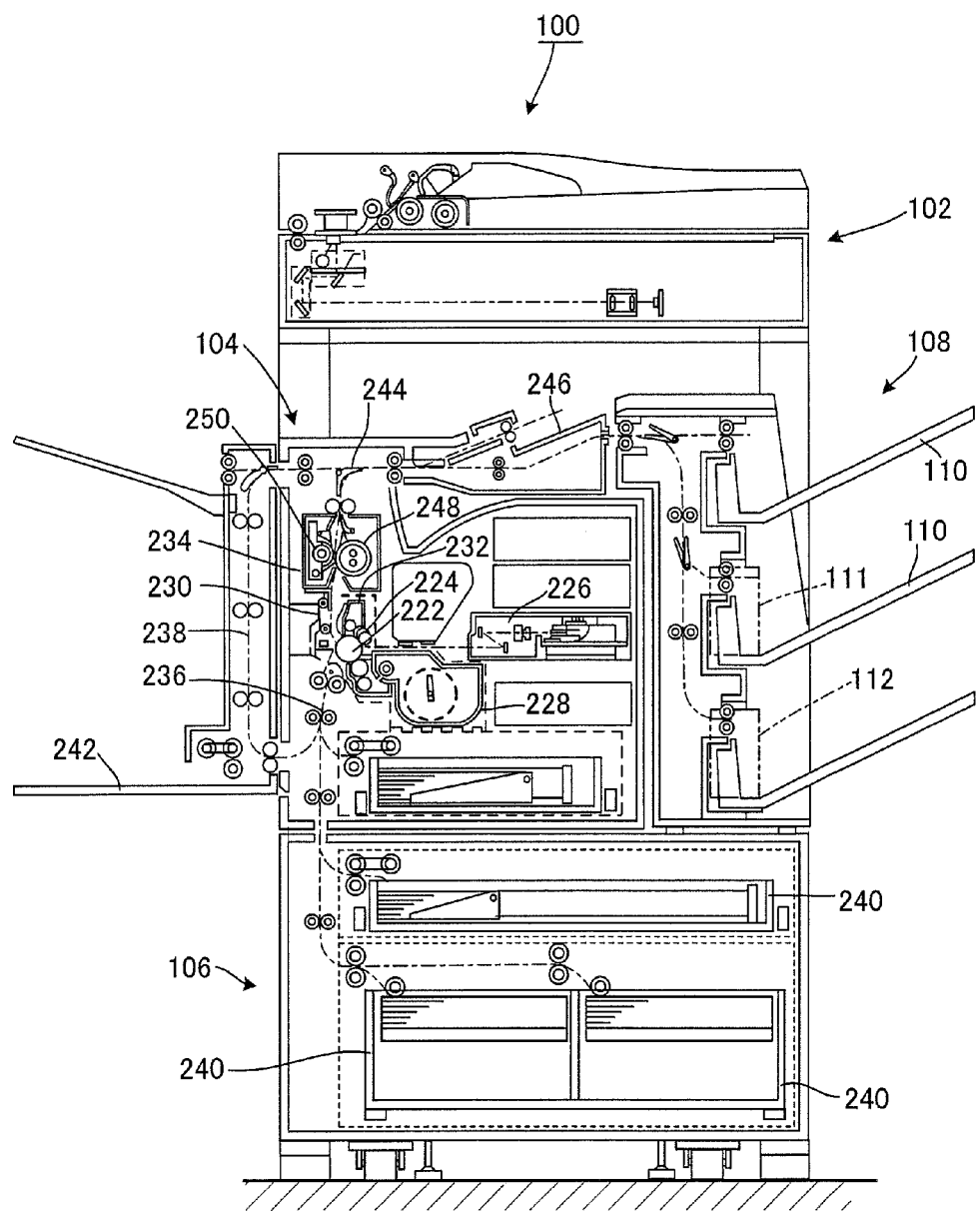
FIG. 2 is an illustrative view schematically showing the internal mechanisms of the image forming apparatus.
Figure 3:
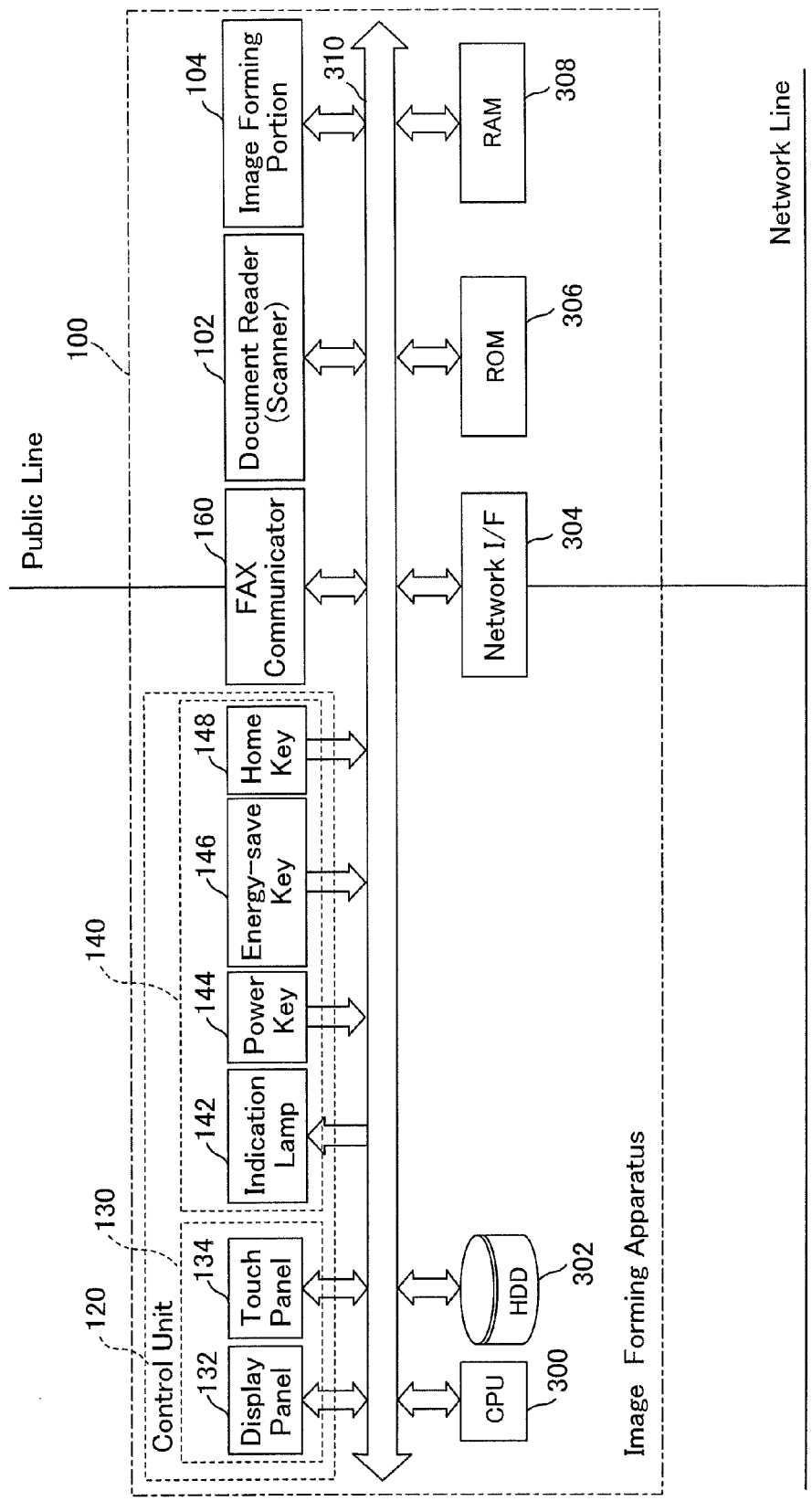
FIG. 3 is a functional block diagram showing a hardware configuration of the image forming apparatus.
Figure 4:
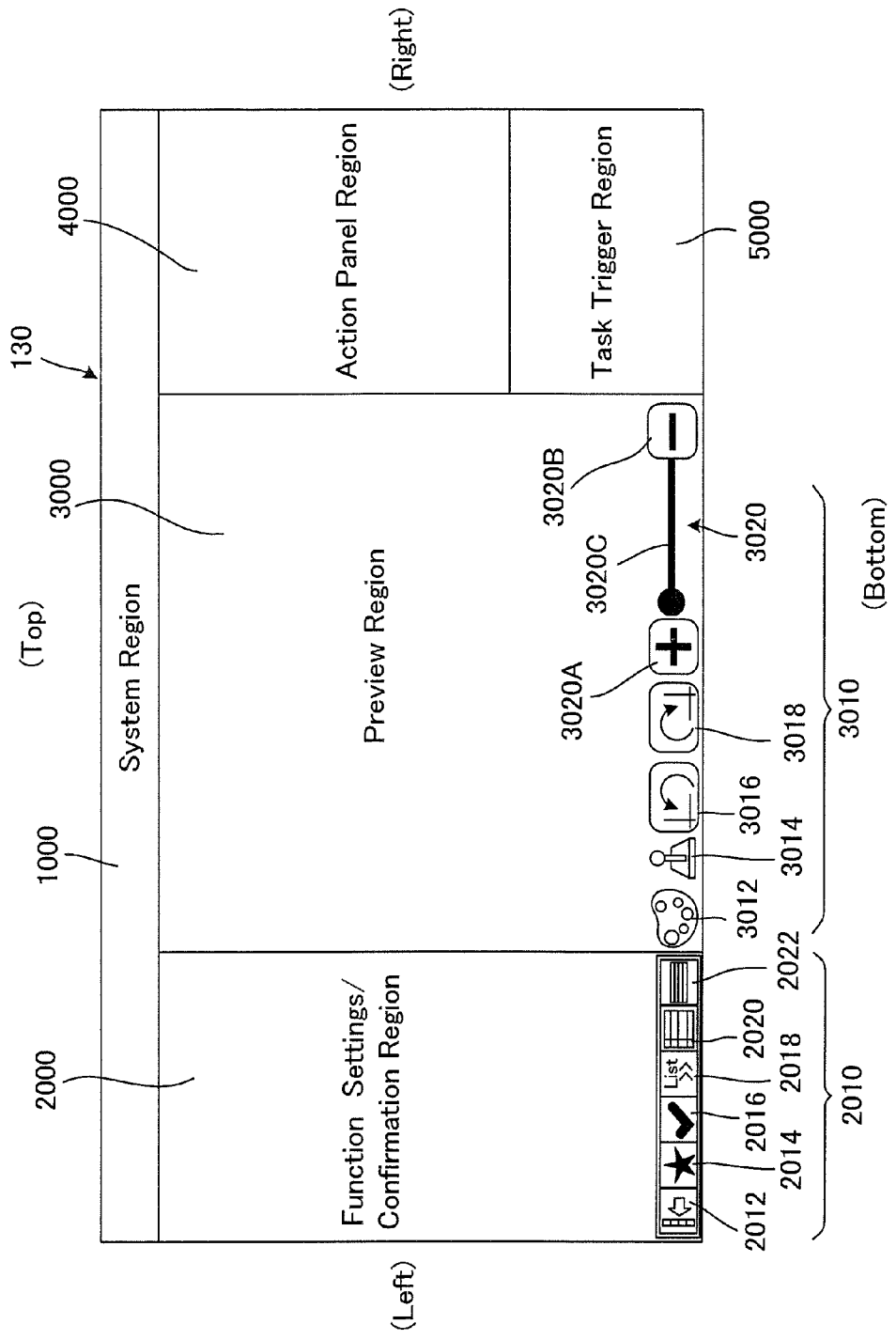
FIG. 4 is an illustrative view showing display regions on a touch panel display of the image forming apparatus.
Figure 5:
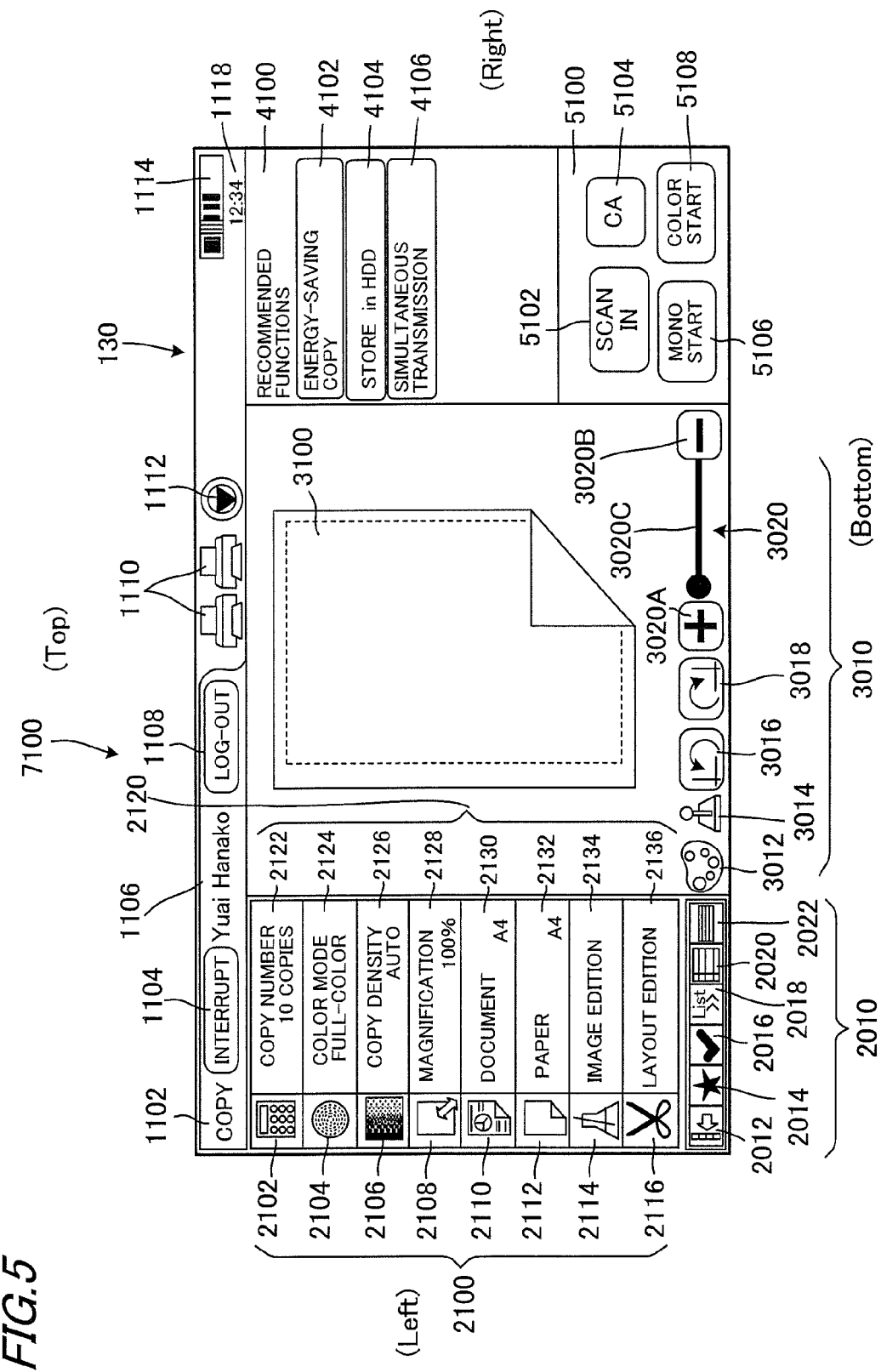
FIG. 5 is an illustrative view showing a screen example displayed on the touch panel display.
Figure 6:
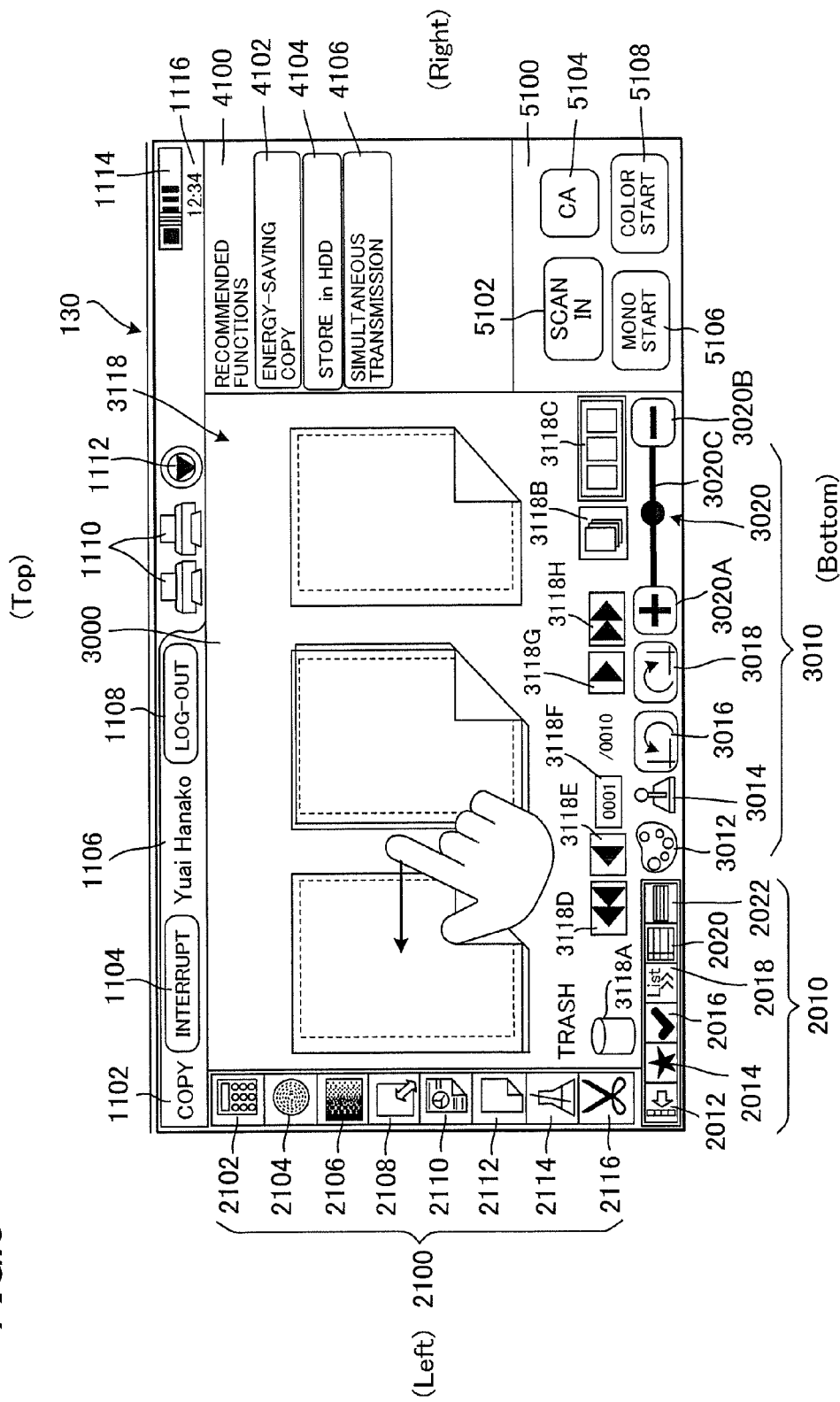
FIG. 6 is an illustrative view showing a state where the preview region being displayed on the touch panel display is changed.

FIG. 1 is an illustrative view of one example mode of carrying out the present invention, showing an overall configuration of an image forming apparatus according to the embodiment of the present invention. FIG. 2 is an illustrative view schematically showing the internal mechanisms of the image forming apparatus. FIG. 3 is a functional block diagram showing a hardware configuration of the image forming apparatus. FIG. 4 is an illustrative view showing preview display region on a touch panel display of the image forming apparatus. FIG. 5 is an illustrative view showing a screen example displayed on the touch panel display. FIG. 6 is an illustrative view showing a state where the preview region being displayed on the touch panel display is modified.

An image forming apparatus 100 according to the embodiment of the present invention, as shown in FIG. 1, includes: a document reader (input unit) 102 for capturing image data; an image forming portion 104 for forming an image on a recording medium based on the image data input through document reader 102; and a control unit (image display control device) 120 having a display panel (display portion) 132 for displaying preview images based on image data and a control unit-side controller (display controller) 131 (see FIG. 9) for displaying display images based on the image data input from document reader 102 in a preview representation on display panel 132.

The multiple document images displayed on display panel 132 may include preview display images of document images captured by the document reader etc., of image forming apparatus 100 and finished preview images of images formed on recording paper by the image forming portion.

Image forming apparatus 100 is a kind of an image processing apparatus. The image display control device according to the present invention is also applicable to image processing apparatus and electronic appliances other than the image forming apparatus of this kind.

Further, image forming apparatus 100 includes a plurality of operational modes, and is equipped with a display device for displaying information for each operational mode. The display device is preferably constructed so as to be able to display information the user wants in a user friendly manner even if the user does not remember the screen configuration when the operational mode is changed over.

Here, image forming apparatus 100 includes a touch panel display (control screen) that can be controlled by both gesture control and touch control other than gesture control, but the image forming apparatus may use a touch panel display that can be controlled by touch control only. Alternatively, the image forming apparatus may include a display panel that cannot be touch-controlled but can display only, with keys for control.

Here, gesture control means controls that are related to various kinds of movements of fingers in combination with GUI (Graphic User Interface), such as responses in accordance with the distance moved and speed of the fingers, double-tapping, the moving fingers trace and the like that are given with meanings.

This image forming apparatus 100 forms images on recording paper based on electrophotography.

Image forming apparatus 100 includes, as its operation modes, copy mode, facsimile mode (FAX mode), document filing mode (a mode in which scanned images are stored in a storage inside the image forming apparatus) and mail mode (a mode in which scanned images are transmitted in the form of an attachment file to an e-mail). This image forming apparatus 100 may further have a network printer mode.

The image forming apparatus 100 changes the display content on the screen every time the operation mode is switched. Further, the printing mechanism is not limited to electrophotography.

To begin with, image forming apparatus 100 will be described.

Image forming apparatus 100 according to the present embodiment includes document reader 102, image forming portion 104, a paper feed portion 106, a paper output processor 108 and a control unit 120, as shown in FIG. 1.

Control unit 120 is formed of a touch panel display 130 and a display control portion 140. Touch panel display 130 is comprised of a display panel 132 of a liquid crystal panel or the like and a touch panel (touch control detecting means) 134 that is laid over display panel 132 to detect the positions the user presses with fingers. Display control portion 140 includes an indication lamp 142, a power key 144, an energy-save key 146 and a home key 148 that resets the display content of touch panel display 130 to the home screen for operational mode selection.

In this way, image forming apparatus 100 has touch panel display 130 as a main control device and also has a display control portion 140 that includes the hardware keys and indication lamps. The keys (power key 144, energy-save key 146 and home key 148) on display control portion 140 are given as hardware buttons, in contrast to software buttons formed by touch panel display 130.

Note that image forming apparatus 100 should not be limited to that including display control portion 140 of this kind, but may be provided with touch panel display 130 only. That is, it will work as long as the initial screen of the selected operational mode can be actuated when the user selects an operational mode on the home screen displayed on touch panel display 130. Next, the operational modes of this image forming apparatus 100 will be described.

(Copy Mode)

The operation of the copy mode of image forming apparatus 100 will be described.

In this copy mode, image reader (which will be referred to hereinbelow as "scanner") 102 and image forming portion 104 operate mainly.

A document placed on a document placement table is read as image data by scanner 102 and the read image data is input to a CPU 300 of a microcomputer etc. shown in FIG. 3, where the image data undergoes various kinds of image processing, and the processed image data is output to image forming portion 104.

As shown in FIG. 2, image forming portion 104 is a mechanism that prints images of documents given as image data onto recording mediums (recording paper in most cases), including a photoreceptor drum 222, a charging device 224, a laser scan unit (which will be referred to hereinbelow as "LSU") 226, a developing device 228, a transfer device 230, a cleaning unit 232, a fixing unit 234, an unillustrated charge eraser and other devices.

Also, image forming portion 104 is provided with a main feed path 236 and a reverse feed path 238. The recording paper fed from paper feed portion 106 is conveyed along main feed path 236. Paper feed portion 106 draws recording paper, one sheet at a time, from a stack of recording paper, held in a paper feed cassette 240 or set on a manual feed tray 242 and delivers the recoding paper to main feed path 236 of image forming portion 104.

In the course of the recording paper being conveyed along main feed path 236 of image forming portion 104, the recording paper passes through and between photoreceptor drum 222 and transfer device 230 and then passes through fixing device 234 to perform printing for the recording paper.

While photoreceptor drum 222 rotates in one direction, its surface is cleaned by cleaning device 232 and the charge erasing device, then uniformly electrified by charging device 224.

LSU 226 modulates the laser beam based on the image data to be printed and repeatedly scans the laser beam over the photoreceptor drum 222 surface in the main scan direction, to form an electrostatic latent image on the photoreceptor drum 222 surface.

Developing unit 228 supplies toner to the photoreceptor drum 222 surface and develops the electrostatic latent image to form a toner image on the photoreceptor drum 222 surface.

Transfer device 230 transfers the toner image on the photoreceptor drum 222 surface to the recording paper which passes through the nip between the transfer device 230 and photoreceptor drum 222.

Fixing device 234 includes a heat roller 248 for heating recording paper and a pressing roller 250 for pressing recording paper. The recording paper is heated by heat roller 248 and pressed by pressing roller 250 so that the toner image transferred to the recording paper is fixed to the recording paper. A heater in the heat roller is heated by the power supplied to this fixing unit 234 so as to control and keep heat roller 248 at a temperature suitable for fixing. When the apparatus enters the energy saving mode, for instance the power supplied to this heater is stopped or cut down.

Arranged at the junction between main feed path 236 and reverse feed path 238 is a branch claw 244. When printing is performed on one side of recording paper only, branch claw 244 is positioned so as to lead the recording paper from fixing device 234 toward a paper output tray 246 or paper output processor 108.

When printing is performed on both sides of recording paper, branch claw 244 is rotated in the predetermined direction so that the recording paper is once conveyed toward the paper output tray 246 side. Then, the paper is switched back and conveyed toward reverse feed path 238. The recording paper then passes through reverse feed path 238 and is inverted upside down and fed to main feed path 236 again. The recording paper is once again printed on its rear side in the course of main feed path 236 and lead to paper output tray 246 or paper output processor 108.

The recording paper thus printed is lead to paper output tray 246 or paper output processor 108 and discharged to either paper output tray 246 or each of paper output trays 110 of paper output processor 108.

In paper output processor 108, a plurality of recording sheets are sorted and discharged to individual paper output trays 110, and/or each set of recording sheets is punched or stapled. For example, when multiple copies of printed documents are prepared, the printed recording sheets are sorted and discharged to paper output trays 110 so that one copy of the printed documents is allotted to individual paper output tray 110, and the printed documents on each paper output tray 110 are punched by a punching unit 111 or stapled by a stapling unit 112 to prepare individual printed material.

(Facsimile Mode)

Next, the operation in facsimile mode will be described.

In this facsimile mode, the transmitting operation is mainly effected by document reader (scanner) 102 and a FAX communicator 160, as shown in FIG. 3. The receiving operation is mainly effected by FAX communicator 160 and image forming portion 104.

(Transmitting Operation)

The transmitting operation is performed by the steps of: selecting the facsimile mode, reading image data from a document placed on the document placement table by means of document reader 102, supplying the read image data to CPU 300 made up of a microcomputer etc. shown in FIG. 3 where the image data is subjected to various kinds of image processes, and outputting the thus obtained image data to the FAX communicator (FAX communicator 160 in FIG. 3).

As shown in FIG. 3, FAX communicator 160 of the transmission side image forming apparatus 100 connects the selected transmitter side line to the designated destination, converts the image data into communication data conforming to the facsimile communication standard and transmits the communication data to the receiver side facsimile machine (e.g., image forming apparatus 100 having a facsimile function).

(Communication Operation)

When connection of the line is established, FAX communicator 160 of image forming apparatus 100 on the receiver side detects a communication request signal from FAX communicator 160 of image forming apparatus 100 on the transmitter side and sends a response signal. Then, for example, FAX communicators 160 on both the transmitter and receiver sides exchange facsimile performance information of their own with each other and determine the communication rate and coding and code correction scheme of the image data within the available maximum capacity to set up a modem communication scheme. The data is transmitted based on this communication scheme, from FAX communicator 160 of image forming apparatus 100 on the transmitter side to FAX communicator 160 of image forming apparatus 100 on the receiver side. When data transmission is ended, the line is cut off.

(Receiving Operation)

The FAX communicator 160 of image forming apparatus 100 on the receiver side converts the received data into image data and sends the data to image forming portion 104. Here, the received data may be converted into image data by image forming portion 104. Image forming portion 104 prints images of documents represented by the image data converted from the received data, onto recording paper, in the same manner as the above-described operation in copy mode.

Next, the control block configuration of image forming apparatus 100 will be described with reference to the drawings.

As shown in FIG. 3, image forming apparatus 100 includes: control unit 120 that allows the user to set copy mode and facsimile mode; a ROM 306 for storing programs etc.; a hard disk 302 serving as a non-volatile storage area that can hold programs, data and the like even if the power is cut off; and a RAM (Random Access Memory) 308 that offers a storing area when a program is executed.

Image forming apparatus 100 further includes: a bus 310 connected to image reader 102, image forming portion 104, FAX communicator 160, control unit 120, ROM 306, hard disk 302 and RAM 308; and CPU 300 that is connected to bus 310 to realize general functions as an image forming apparatus.

Hard disk 302 records (stores) files of image data of documents scanned by the image forming apparatus 100. Hard disk 302 also stores initial screen data for each operational mode. The files and data stored in hard disk 302 can also be recorded in ROM 306.

Stored in ROM 306 are programs, data and the like necessary for controlling the operation of image forming apparatus 100. As the data stored in ROM 306 with the programs, the initial screen data for each operational mode may be stored. CPU 300 controls image forming apparatus 100 in accordance with the programs and data stored in ROM 306 and performs control associated with each function of image forming apparatus 100.

As shown in FIG. 3, a public line for exchange of image data is connected to FAX communicator 160 of this image forming apparatus 100 while a network line is connected to a network interface 304. This network line may be connected to a computers etc. that use this image forming portion 100 as a network printer or may be connected via the internet to a computer etc. that is identified by a designated URL (Uniform Resource Locator). When connected to the Internet in this way, the image forming apparatus 100 can obtain the necessary information via the Internet.

RAM 308 offers a function as a working memory for temporarily recording the result of the operation and processing by CPU 300 and a function as a frame memory for recording image data.

Control of image reader 102, image forming portion 104, touch panel display 130 and display control portion 140 forming control unit 120, ROM 306, hard disk 302 and RAM 308 is performed by CPU 300 executing predetermined programs. Here, control unit 120 communicates with CPU 300 by way of an input/output interface.

Control unit 120 is given as a board-like panel that is tilted so as to allow the user ease of view. Control unit 120 includes touch panel display 130 in the left area and display control portion 140 (including indication lamp 142 and hardware buttons, namely, power key 144, energy-save key 146 and home key 148) in the right area on the top thereof. Touch panel display 130 and display control portion 140 are integrally provided in control unit 120.

As described above, this touch panel display 130 is formed of display panel 132 and touch panel 134 that is laid over display panel 132.

Displayed on touch panel display 130 are the home screen for selection of the operational mode of image forming apparatus 100, the current status of this image forming apparatus 100, the status of destination selection, job processing status and the like.

Displayed in the preview display region of display panel 132 are selection buttons as software keys. When the displayed area of a selection button is pushed by a finger, touch panel 134 detects the pushed position. Then, the position on which touch panel 134 is pressed is compared with the positions of selection buttons so as to perform selection of an operational mode of image forming apparatus 100, functional setting, operational instructions, and the like. In addition to this touch control (command input control based on the position of the user's pressing), this image forming apparatus 100 also supports the above-mentioned gesture control (command input control based on the trace of user's control motion).

Further, indication lamp 142 of display control portion 140 is made up of a LED (Light Emitting Diode) for instance and is controlled by CPU 300 so as to turn on/off(/flash on and off). When the user presses down power key 144 that is provided separately in addition to the main power switch, this image forming apparatus 100 comes out of standby mode (in which, for example, only fax reception is permitted with the main power turned on) to active mode so that the whole operational modes of this image forming apparatus 100 can be used. Indication lamp 142 comes on in link with this status. Further, when a predetermined period has elapsed without receiving any user input, or when the user presses energy-save key 146, this image forming apparatus 100 comes out of active mode into energy save mode so that only part of the operational modes of image forming apparatus 100 are operational. Indication lamp 142 flashes on and off in link with this status. Further, when the user presses energy-save key 146 in this energy save mode, the image forming apparatus 100 comes out of energy save mode into active mode. Home key 148 is a hardware key for retuning the display of touch panel display 130 into the initial condition (home screen). It is noted that the operations when power key 144, energy-save key 146 and home key 148 are pressed should not be limited to these.

The hardware keys on display control portion 140 (power key 144, energy-save key 146 and home key 148) may be embedded with a key lamp controlled by CPU 300 so as to turn on/off(/flash). For example, this key lamp may be a round type key ring-like lighting or center lighting. This key lamp turns on at the timing that the hardware key is permitted to use as a control device (at the timing that operation is performed when the hardware key is used).

Image forming apparatus 100 has the aforementioned two operational modes (copy mode and facsimile mode). Software buttons for function settings in each operational mode are displayed on touch panel display 130, and also the preview as the on-screen form of forming images, keys for destination setting and the like are displayed as necessary.

When the operational mode is different from that which the user wants, touch panel display 130 displays another screen. Even in such a case, in order for the user to easily find the information the user requests, touch panel display 130 is divided into multiple regions (which also are given in a size variable manner) so as to display necessary information in each region.

In particular, in this image forming apparatus 100, when one operational mode is selected on the home screen of touch panel display 130 provided as the main display control device, the initial screen of the operational mode is displayed.

In this initial screen, (1) the basic layout is formed of five areas, namely "system region", "function selecting region", "preview region", "action panel region" and "task trigger region", which are appropriately arranged, so that the user is able to easily perform input of settings from top left to bottom right (in the same manner as the user moves their gaze and fingers in the conventional machine which is not provided with a large scale touch panel display 130). Further, (2) the concept of the displays of the five regions is consistent in all operational modes, so that the user is able to operate without confusion when another operational mode is used. The following description will be given on the configuration of the basic layout.

The basic layout in touch panel display 130 will be described with reference to the drawings.

As shown in FIG. 4, the basic layout of touch panel display 130 is designed in the laterally long touch panel display 130 such that a system region 1000 is arranged at the topmost part, a preview region (preview display region) 3000 in the center of the screen, a function settings/confirmation region 2000 on the left side of preview region 3000, an action panel region 4000 on the upper right part of preview region 3000, and a task trigger region (control key displayed region) 5000 on the lower right of preview region 3000. Here, the laterally long touch panel display 130 is formed of, for example, 1024 pixels wide×600 pixels high. Further, function settings/confirmation region 2000 will be written hereinbelow as function selecting region 2000.

It is noted that the number of regions in touch panel display 130 should not be limited to five. Also, the horizontal arrangement should not be limited so that the horizontal arrangement may be reversed right side left, for example, depending on the user's dominant hand. Further, the position of system region 1000 may be disposed at the lowermost part. Alternatively, the system region 1000 may be undisplayed depending on the status or settings.

System region 1000 displays the current status of this image forming apparatus 100, e.g., the title of the operational mode in control and the status and conditions of image forming apparatus 100. For example, displayed in system region 1000 are the name of operational mode, the cut-in key, the log-in user name, the job status in progress, the usage status of built-in memory, time and the like.

In function selecting region 2000, settings in each function, display switching, function selecting menu (icons, buttons, etc.) operated by user to confirm settings are variably displayed in a selected display style, i.e., in icon mode, regular mode or express mode. In icon mode, only icons for function setting are displayed in function selecting region 2000 so as to maximize the size of preview region 3000. In express mode, the display of function selecting region 2000 is enlarged so as to allow the user to set the function all at once though the size of preview region 3000 is minimized. In regular mode, preview region 3000 is sized between that in the icon mode and that in the express mode while in function selecting region 2000 the text of function titles are displayed together with functional setting icons.

These icon mode, regular mode and express mode are switched from one to another based on user control. That is, the size of preview region 3000 is modified and displayed in accordance with user control. In this way, since icons are able to give information to the user by using limited area, it is preferable that every function is given with an icon so as to be able to enlarge the display of preview region 3000.

This function selecting region 2000 includes at its bottom a group of select buttons 2010 for switching the display style in function selecting region 2000. Arranged in the group of select buttons 2010 are an icon mode entering button 2012 for displaying function selecting region 2000 in icon mode, a favorite button 2014 for displaying the functions registered as "favorites", a check button 2016 for displaying the functions whose settings have been modified, a list button 2018 for displaying a list of all the functions that can be designated in the selected operation mode, a regular mode entering button 2020 for displaying function selecting region 2000 in regular mode, and an express mode entering button 2022 for displaying function selecting region 2000 in express mode.

Here, when there are many pieces of information to be displayed in function selecting region 2000, the information is displayed in this function selecting region 2000, in a vertically movable manner. In this case, this group of select buttons 2010 is not moved but constantly displayed in the bottom-most portion of function selecting region 2000.

Preview region 3000 displays the image of the output pages of the (finished) document. The image is displayed using dummy data or scanned data, and the displayed image in preview region 3000 is revised every time the user changes the finish. There are two modes of displaying the finish in this preview region 3000: the display of the final preview with a dummy image in virtual mode before scanning and the display of the final preview with actual images in scan-in mode after scanning. The virtual mode further has two types, before setting documents and after setting documents.

At the bottom of this preview region 3000 there is a group of preview select buttons 3010 for changing the display style in preview region 3000. The group of preview select buttons 3010 includes a rotate-left button 3016 for rotating the image left 90 degrees and a rotate-right button 3018 for rotating the image right 90 degrees and a zoom bar 3020. Other than these, for example a change color button 3012 and preview control button 3014 are arranged.

With this, when rotate-left button 3016 is touched once, the preview rotates 90 degrees left. When the button is touched twice, the preview is rotated 180 degrees left (inverted upside down). Alternatively, when the image of the finished document displayed in the preview region is gesture-controlled (by rotating the document image 180 degrees counterclockwise with the fingertip), the preview is rotated 180 degrees left or inverted upside down.

When rotate-right button 3018 is touched once, the preview rotates 90 degrees right. When the button is touched twice, the preview is rotated 180 degrees right (inverted upside down). Alternatively, when the image of the finished document displayed in the preview region is gesture-controlled (by rotating the document image 180 degrees clockwise with the fingertip), the preview is rotated 180 degrees right or inverted upside down.

When the (+) button 3020A of zoom bar 3020 is touched, or when bar 3020C is gesture-controlled (by the "drag or flick" gesture) toward the (+) button 3020A, the preview image is enlarged. Alternatively, when the image of the finished document displayed in the preview region is gesture-controlled (on the document image by the "pinch out/pinch open" gesture with fingertips), the preview image is enlarged. Here, the "drag" gesture is an action of moving the finger. The "flick"

gesture is a swiping action of the finger. The "pinch out/pinch open" is an action of spreading the two fingertips apart.

When the (−) button 3020B of zoom bar 3020 is touched, or when bar 3020C is gesture-controlled (by "drag or flick" gesture) toward the (−) button 3020B, the preview image is reduced. Alternatively, when the image of the finished document displayed in the preview region is gesture-controlled (on the document image by the "pinch in/pinch close" gesture with fingertips), the preview image is reduced. Here, the "pinch in/pinch close" is an action of bringing the two fingertips together.

When there are many pages of document images to be displayed in preview region 3000, touchable displayed page select buttons (page number input buttons, page up and down buttons, single page display button and multiple page display button, etc.) may be displayed. In this case, it is also possible to turn over or return the page of the document to be previewed by a sliding touch (flicking) of the document image. Further, when the document image to be displayed in preview region 3000 is large, scroll bars that can be touched or gesture-controlled may be displayed.

Action panel region 4000 displays information such as hint, advice and suggestion for operation and control. Display in this action panel region 4000 is given such that when a particular function is selected by a certain user, the functions associated with the subject function may be displayed, another function as to the subject function may be displayed in a purpose-oriented manner, or the function that was selected in the past in combination with the subject function by the same user or a user of the group to which this user belongs may be displayed as a "recommended function".

Task trigger region 5000 displays trigger items that the user operates in order to actually cause the image forming apparatus 100 to operate after all the settings in the operational mode have been completed. An example is the start button (software button) for starting the operation. Here, since information on a lack of a consumable supply is also related to the unfeasibility of the task in the operational modes needing a printing process (other than fax transmission), this should be also displayed in this "task trigger region".

In this case, it is also preferable that the start button is displayed only when the start button can be pressed down. The condition in which the start button can be pressed down, means a state where all settings have been completed and none of consumable supplies (recording paper and toner) will run short in the case of an operational mode needing a printing operation or a state where all the transmission parameters including destination have been set in the case of a fax mode (transmission) operation as the operational mode needing no printing.

The layout of these five regions is not changed even if the operational mode is switched from one to another (in the initial screen of any operational mode). Further, each region may change in size, expanding or contracting in the horizontal (longitudinal) direction of the screen of touch panel display 130 as in the case where the display of function selecting region 2000 (and preview region 3000) is switched between icon mode, regular mode and express mode.

The layout of the five regions is designed in light of the user interfaces in conventional machines, by directing attention to user's path of gaze and control. This arrangement leads the user to perform settings by moving their gaze from top left to bottom right and moving their input action (fingers of the dominant hand) from top left to bottom right.

In this arrangement, for switching the operational mode from one to another, the user presses down home key 148 (FIG. 3) and selects another operational mode on the home screen. In this way, it is possible to change operational mode by way of the home screen.

(Initial Screen Display Operation in Copy Mode)

When copy mode is selected, the initial screen for copy mode is displayed on touch panel display 130 using copy mode initial screen data loaded from hard disk 302 (FIG. 3) or the like.

In this occasion, a copy mode initial screen 7100 is displayed for example, on touch panel display 130, as shown in FIG. 5. Copy mode initial screen 7100 displays information using the five divided regions laid out as described above.

In system region 1000 (FIG. 4) of copy mode initial screen 7100, areas 1102, 1104, 1106, 1108, 1110, 1112, 1114 and 1116 are laid out as shown in FIG. 5.

Area 1102 denotes the operational mode being selected (copy mode in this case). Displayed in area 1102 is the name and/or icon of the operational mode.

It is also preferred that a pulldown menu showing operational modes is displayed so as to allow for switching of operational mode when this area 1102 is touch-controlled, tapped or double-tapped (the same in other operational modes).

Area 1104 displays sub information entailing the selected operational mode.

In area 1104 a cut-in key (software button) is displayed as sub information. When this cut-in key is touch-controlled, tapped or double-tapped, a cut-in process can be actuated in copy mode.

Area 1106 displays the log-in user name.

In area 1108 a log-out button (software button) is displayed.

Area 1110 displays the status of the job in progress.

Area 1112 displays buttons (software buttons) related to job status.

That is, area 1112 displays the status of the job in progress with an icon. This job status is touch-controlled, tapped or double-tapped, the job status information is displayed in detail. It is further preferable that a button for suspending the selected job and the like is displayed in area 1112.

Area 1114 displays the communication status and area 1116 displays the current time.

Displayed in function selecting region 2000 (FIG. 4) on copy mode initial screen 7100 are a function selecting menu 2100 that allows the user to select in copy mode and a group of select buttons 2010 described above. In the screen shown in FIG. 5, the function select menu is displayed in regular mode.

As shown in FIG. 5, the function select menu displayed in regular mode is composed of a group of icons 2100 and a group of texts 2120. As the function select menu displayed in function selecting region 2000, texts 2122, 2124, 2126, 2128, 2130, 2132, 2134 and 2136 are displayed.

Text 2122 shows an icon 2102 for setting the number of copies and its set content.

Text 2124 shows an icon 2104 for setting color mode and its set content.

Text 2126 shows an icon 2106 for setting copy density and its set content.

Text 2128 shows an icon 2108 for setting copy magnification and its set content.

Text 2130 shows an icon 2110 for setting the document type and its set content.

Text 2132 shows an icon 2112 for setting the paper type and its set content.

Text 2134 shows an icon 2114 for image edition and its set content.

Text 2136 shows an icon 2116 for layout edition and its set content.

Here, it should be noted that a greater number of items can be also displayed in the function setting menu, in a vertically scrollable manner with the position of select buttons 2010 fixed. In this case, the displayed items inclusive of hidden items above and below, can be changed from one to another by any of touch control (scroll control) and gesture control (flick control in the vertical direction).

Here, the image edition is edition for one page document, and includes, as a lower-layered menu, frame deletion, printing menu, watermark, user stamp and the like. The layout edition is edition for multiple pages of documents, and includes, as a lower-layered menu, page integration, binding margins, page change, centering and the like. Subordinates menus under these will be displayed on touch panel display 130 by touching, taping or double-tapping icons 2102 to 2116 or texts 2112 to 2136.

Arranged in preview region 3000 (FIG. 4) on copy mode initial screen 7100 are a document output (finish) image 3100 and a group of preview select buttons 3010 stated above. In this arrangement, dummy data or scanned data is used to display image 3100, and the image 3100 is changed and displayed in preview region 3000 every time the function setting menu in function selecting region 2000 is changed (the preview display is changed).

Displayed in action panel region 4000 (FIG. 4) on copy mode initial screen 7100 is information such as hint, advice and suggestion for copying operation. Here, recommended functions in the copy mode that the user selects are displayed as shown in FIG. 5. In this case, action panel region 4000 includes an area 4100 for displaying the content of displayed information and areas 4102 to 4106 that serve in themselves as software buttons and display text indicating recommended functions.

When area 4102 is touch-controlled, tapped or double-tapped, a pulldown menu of further detailed information for energy-saving in copying is displayed. In this case, for example a software button for entering the function setting screen for duplex copying is displayed with text "Duplex printing will save paper", a software button for entering the function setting screen for page integration with text "Printing multiple documents integrally will save paper", and a software button for entering the function setting screen for saddle stitch binding with text "Printing can be done so as to bind the paper as a booklet".

Displayed in task trigger region 5000 (FIG. 4) on copy mode initial screen 7100 is a group of command buttons 5100. These command buttons 5100 include a scan-in key (software button) 5102, a clear-all key (software button) 5104, a monochrome start key (software button) 5106 and a color start key (software button) 5108.

Scan-in key 5102 is a key for causing image forming apparatus 100 to scan a document to obtain image data.

Clear-all key 5104 is a key for clearing the set functions.

Monochrome start key 5106 is a key for causing image forming apparatus 100 to scan a document and perform monochrome copying.

Color start key 5108 is a key for causing image forming apparatus 100 to scan a document and perform color copying.

In this way, when the user inputs a request in copy mode initial screen 7100 displayed with information in five-divided region s, a copying process is effected in accordance with the request.

Next, description will be made on the switching operation of preview pages when preview region 3000 (FIG. 4) is enlarged with function selecting region 2000 (FIG. 4) displayed in icon mode.

When the user flicks left the preview display screen in which a preview image 3118 is displayed as shown in FIG. 6, the input trace is analyzed. In this case, the gesture control by this user is analyzed as a request for turning over the page, and a revised preview image including another page that has not been displayed and corresponds to the direction of the flick is displayed.

It is also possible to change the pages in preview image representation by touching a page forward button 3118G, page fast forward button 3118H, page reverse button 3118E or page fast reverse button 3118D. It is also possible to change the pages in preview image representation by touching a direct pagination button 3118F to directly input the page number the user wants to jump.

In this way, when function selecting region 2000 is displayed in icon mode, preview region 3000 is enlarged so that it is possible to display the preview image so as to improve user' visual recognition and user controllability, as shown in FIG. 6. In particular, it is possible to scroll the preview display up to a preview image the user wants by touch control or gesture control, and display the desired preview image.

Here, designated at 3118A in FIG. 6 is a trash icon. When a selected page is dragged to this trash icon 3118A, the page can be deleted.

When a single page display icon 3118B is pressed down, the preview image with, for example three pages displayed, is changed to one page representation (in this case one page is displayed in a large scale). When a multiple page display icon 3118C is pressed down, the preview image with, for example, one page displayed, is changed to three page representation.

Next, the display modes of the touch panel display in image forming apparatus 100 will be described with reference to the drawings.

Figure 7:
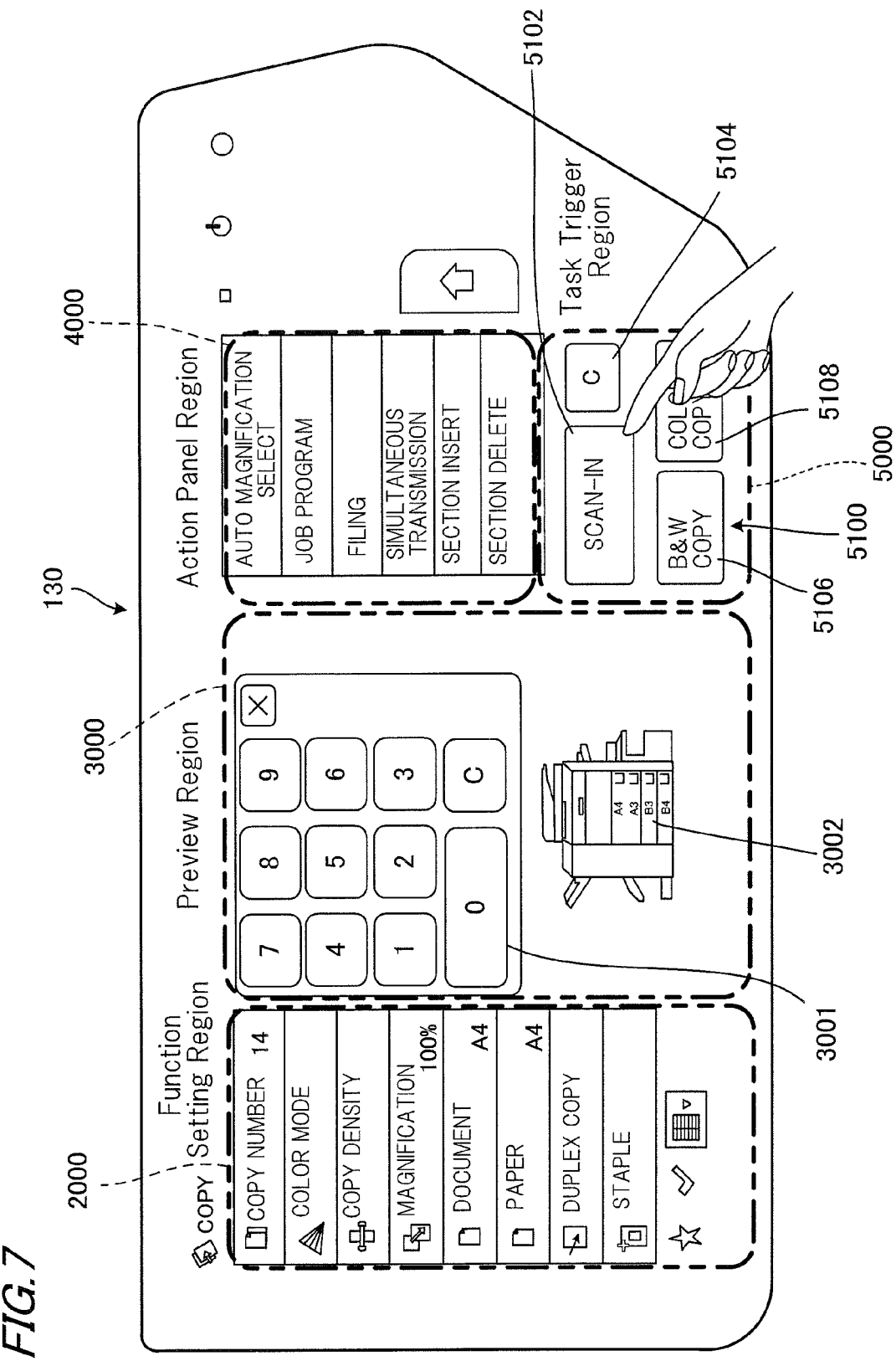
FIG. 7 is an illustrative view showing one display mode example of a display panel of the touch panel display.

FIG. 7 is an illustrative view showing one display mode example of the touch panel display in the image forming apparatus.

As shown in FIG. 7, arranged on touch panel display 130 in image forming apparatus 100 are preview region 3000 in the center of the screen and function selecting region 2000 on the left side of preview region 3000. Action panel region 4000 is laid out on the upper right of preview region 3000, and task trigger region 5000 is arranged under the action panel region 4000.

Displayed in preview region 3000 are a virtual ten-key pad 3001 and a mimic display 3002 giving an image of the whole apparatus.

Displayed in task trigger region 5000 is a group of command buttons 5100.

In the group of command buttons 5100, scan-in key 5102, clear-all key 5104, monochrome start key 5106 and color start key 5108 are laid out.

Next, the electric configuration related to the screen display of control unit 120 will be described with reference to the drawings.

Figure 8:
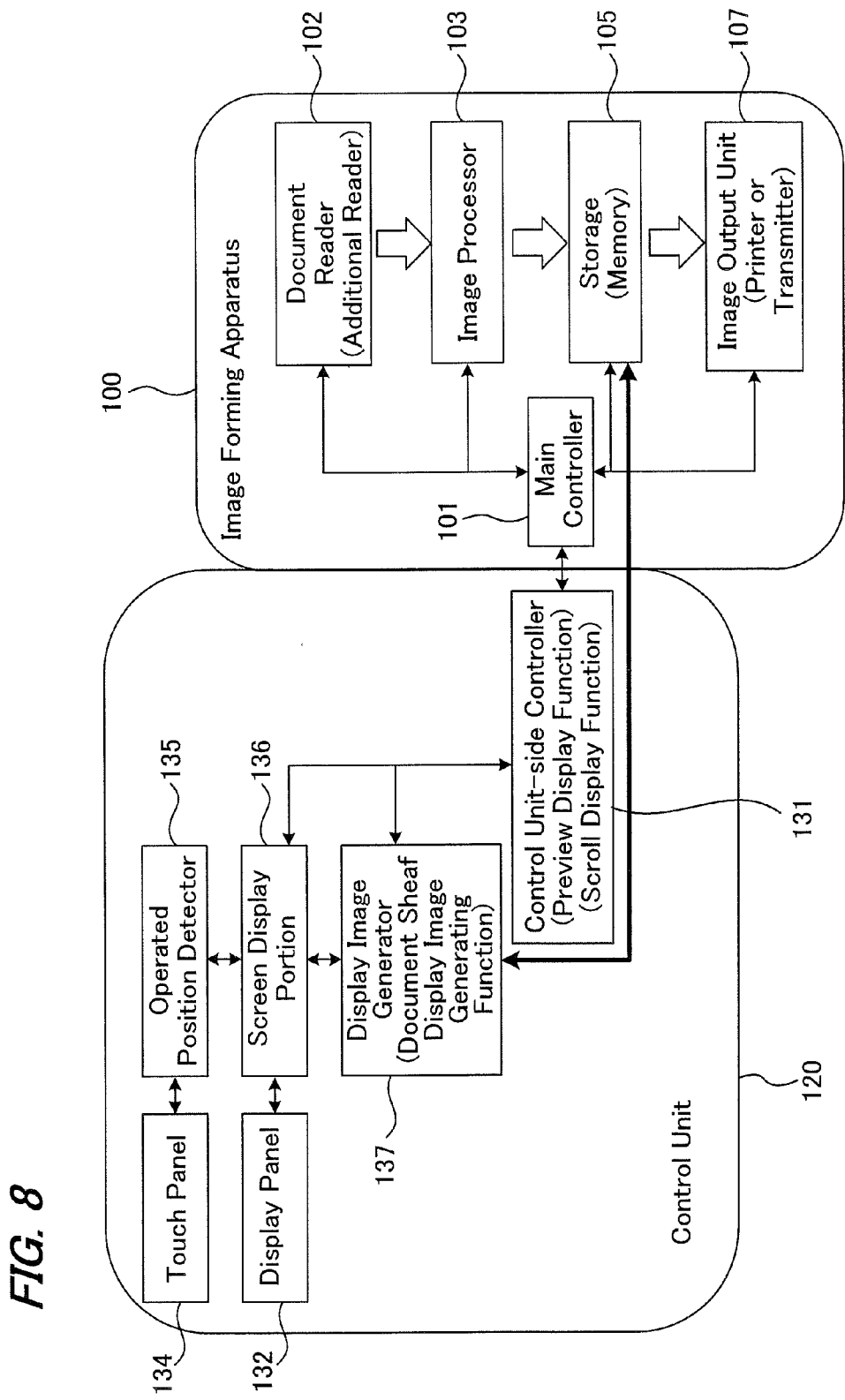
FIG. 8 is a block diagram showing an electric configuration of a control unit in the image forming apparatus.
Figure 9:
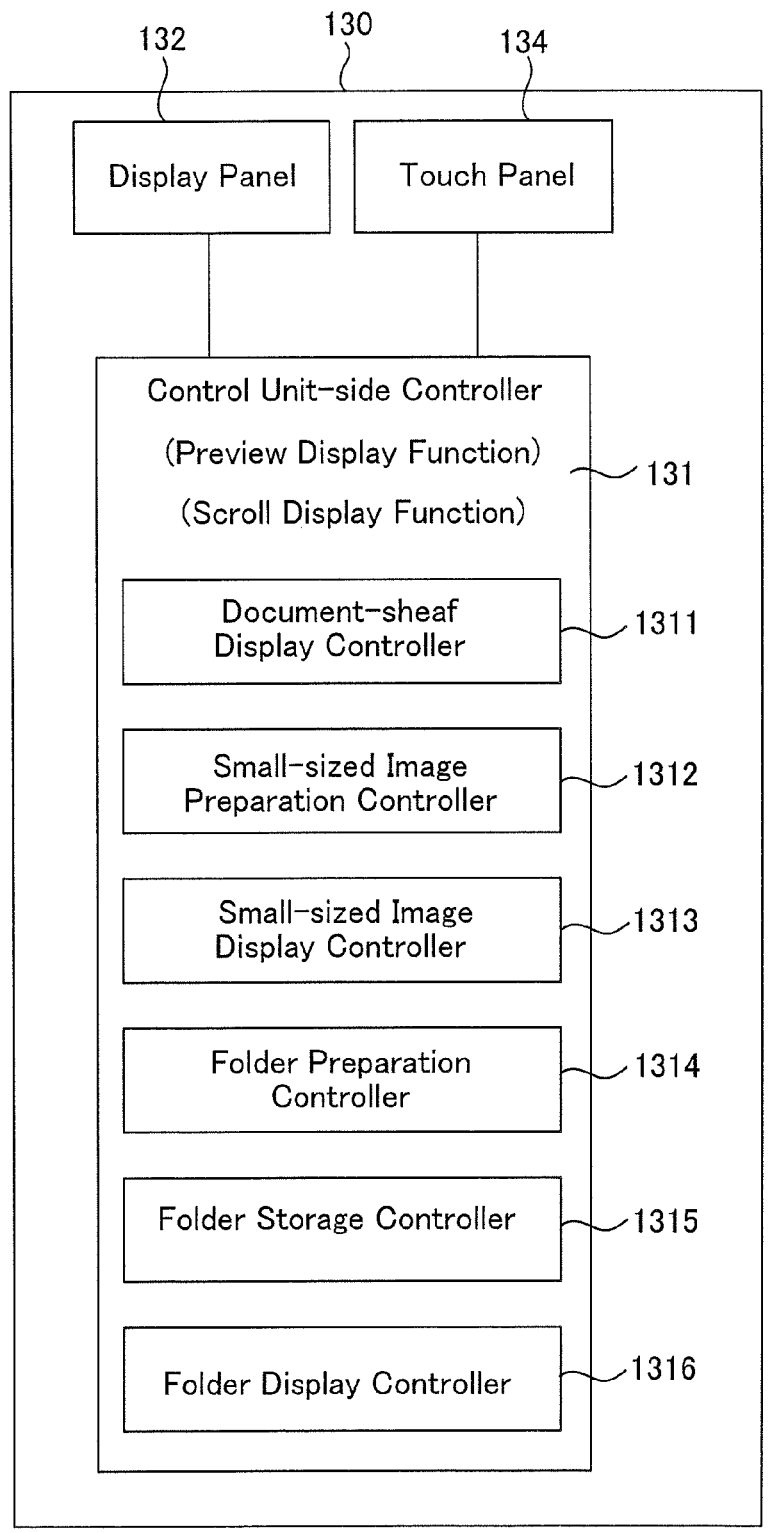
FIG. 9 is a block diagram showing a configuration of the touch panel display of the control unit.

FIG. 8 is a block diagram showing an electric configuration of a control unit in the image forming apparatus. FIG. 9 is a block diagram showing a configuration of the touch panel display of the control unit.

As shown in FIG. 8, control unit 120 includes, in addition to display panel 132 and touch panel 134, an operated position detector 135, a screen display portion 136, a display image generator 137 and control unit-side controller (display controller) 131 for controlling processing and operation in control unit 120.

Image forming apparatus 100 includes document reader 102 for capturing image data, an image processor 103, a storage 105 for storing image data input through document reader 102 and an image output unit 107 such as a printer, transmitter or the like for outputting images, all being operated and controlled by a main controller 101.

Document reader 102 has an additional reading function which enables additional reading (additional input) of additional documents after completion of reading of desired documents (image data).

Operated position detector 135 detects the operated position on touch panel 134.

Screen display portion 136 displays an image formed by display image generator 137 on display panel 132.

Display image generator 137 prepares a predetermined image based on image data input to the main body of image forming apparatus 100, following instructions from control unit-side controller 131 and also has a function of forming display images of document sheaves consisting of a series of multiple documents scanned by image reader 102 (document sheaf display image generating function).

Control unit-side controller 131 is connected to main controller 101 of the main body of image forming apparatus 100 and functions as a controller in touch panel display 130.

Now, control unit-side controller 131 will be described in detail.

As shown in FIG. 9, control unit-side controller 131 has a preview display function of giving a display image based on the documents scanned by document reader 102 on touch panel display 130 in a preview representation and a scroll display function of multiple pages of display images given in a preview representation in a movable manner.

Control unit-side controller 131 further includes a document-sheaf display controller 1311 that provides a display image of a document sheaf made up of a series of multiple documents scanned by document reader 102, and gives display images of multiple document sheaves, including a display image of a document sheaf based on the documents scanned before an additional scanning of documents (which will be called hereinbelow a "previously scanned document sheaf") and a display image of a document sheaf based on the documents additionally scanned (which will be called hereinbelow as a "additional document sheaf"), in a preview representation in a distinctive manner on touch panel display 130. Here, the present embodiment and examples will be described on the assumption that a document sheaf is made up of multiple documents, but the present invention includes a case where a document sheaf consists of a single document.

It should be noted that the previously scanned document sheaf and additional document sheaf are separate document sheaves, each scanned by an individual command input to scan-in key 5102. Accordingly, for the previously scanned document sheaf and additional document sheaf, the settings for scanning of image data, e.g., output image size, layout, paper size, presence/absence of a binding process, binding position and the like, may be either the same with one another or different from each other.

Document-sheaf display controller 1311 may perform control to provide preview display of a plurality of document sheaves in such a manner that the display image (the second display image) of an additional document sheaf (the additional image data) is laid behind the display image (the first display image) of a previously scanned document sheaf (the previous image data) with part of it hidden, that the display image of an additional document sheaf is laid in front of the display image of a previously scanned document sheaf with part of the display image of the previously scanned document sheaf hidden, or that the display image of a previously scanned document sheaf is reduced in size and laid behind the display image of an additional document sheaf with part of it hidden.

Control unit-side controller 131 also includes a small-sized image preparation controller 1312 and a small-sized image display controller 1313.

Small-sized image preparation controller 1312 performs control of preparing an icon (small-sized image picture) corresponding to the display image of the previously scanned document sheaf.

Small-sized image display controller 1313 performs control of displaying the prepared icon around the display image of the additional document sheaf.

Control unit-side controller 131 further includes a folder preparation controller 1314, a folder storage controller 1315 and a folder display controller 1316.

Folder preparation controller 1314 performs control of preparing a folder for storing the display image of the previously scanned document sheaf.

Folder storage controller 1315 performs control of storing a document sheaf into the prepared folder.

Folder display controller 1316 performs control of displaying a folder around the display image of additional document sheaf preview-displayed on preview region 3000 of toner discharge port 130.

Next, examples of preview display on touch panel display 130 when an additional scanning of documents is performed by document reader 102 will be described with reference to the drawings.

Example 1

Example 1 illustrates a configuration of image forming apparatus 100 in which when plural sheaves of documents are given in a preview representation by document-sheaf display controller 1311 of control unit-side controller 131, the display image of an additional sheaf of documents is laid out behind the display image of the previously scanned document sheaf with part of it overlapped and hidden.

Figure 10:
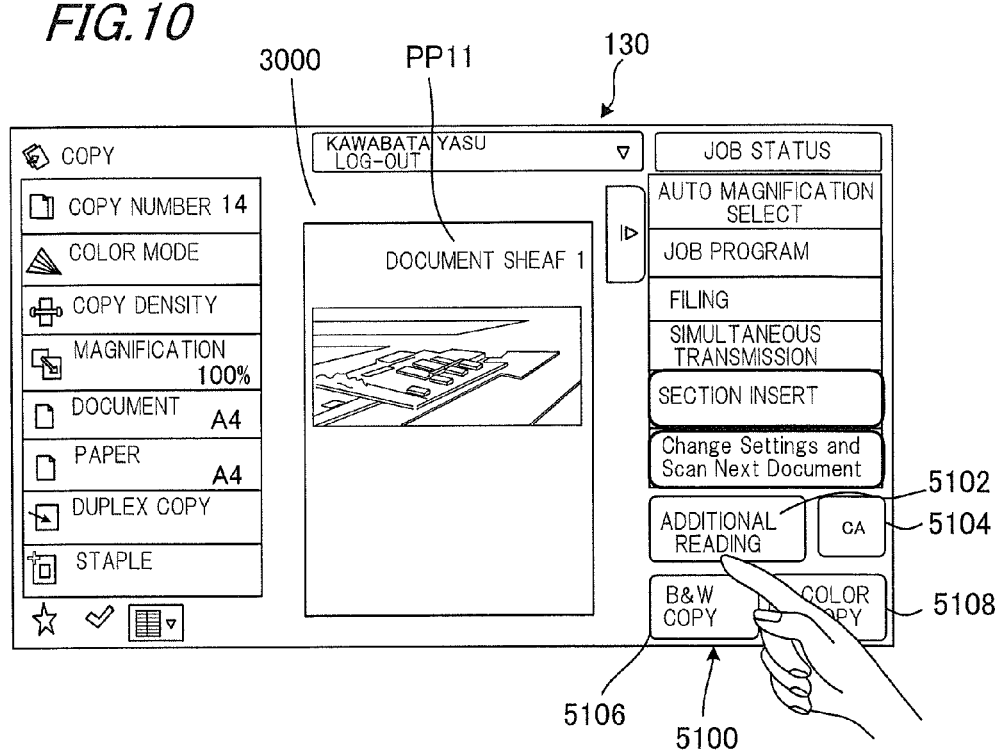
FIG. 10 is an illustrative view showing preview display of a document sheaf displayed on a touch panel display after a document reading operation in an image forming apparatus of example 1.
Figure 11:
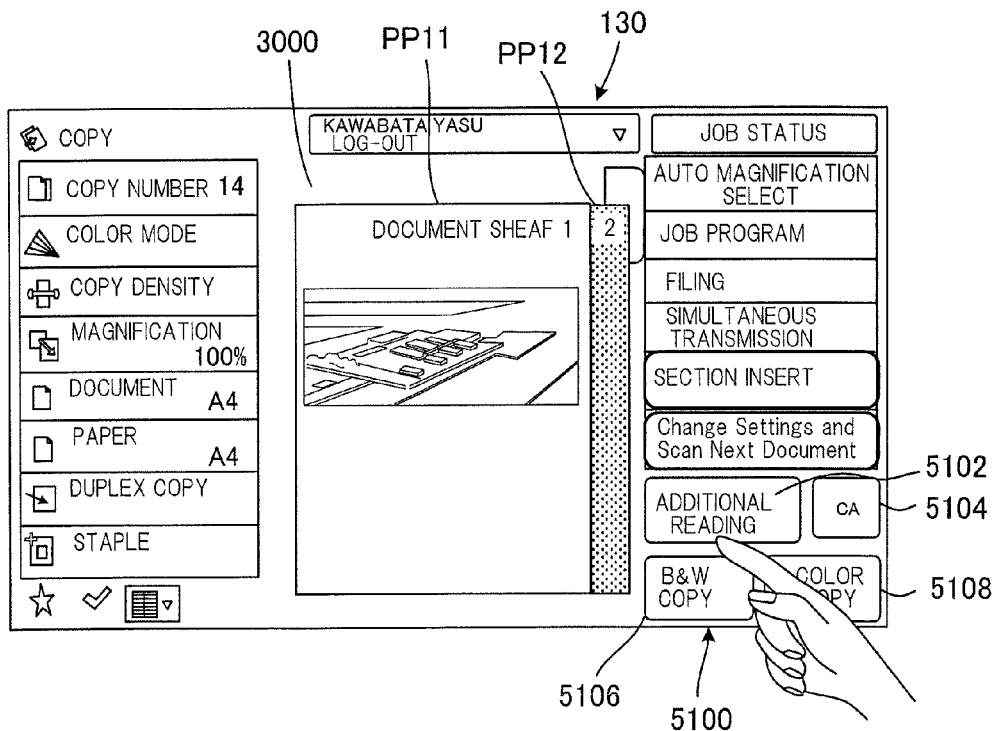
FIG. 11 is an illustrative view showing preview display of multiple document sheaves including an additional document sheaf when an additional reading operation is performed after a document reading operation in example 1.
Figure 12:
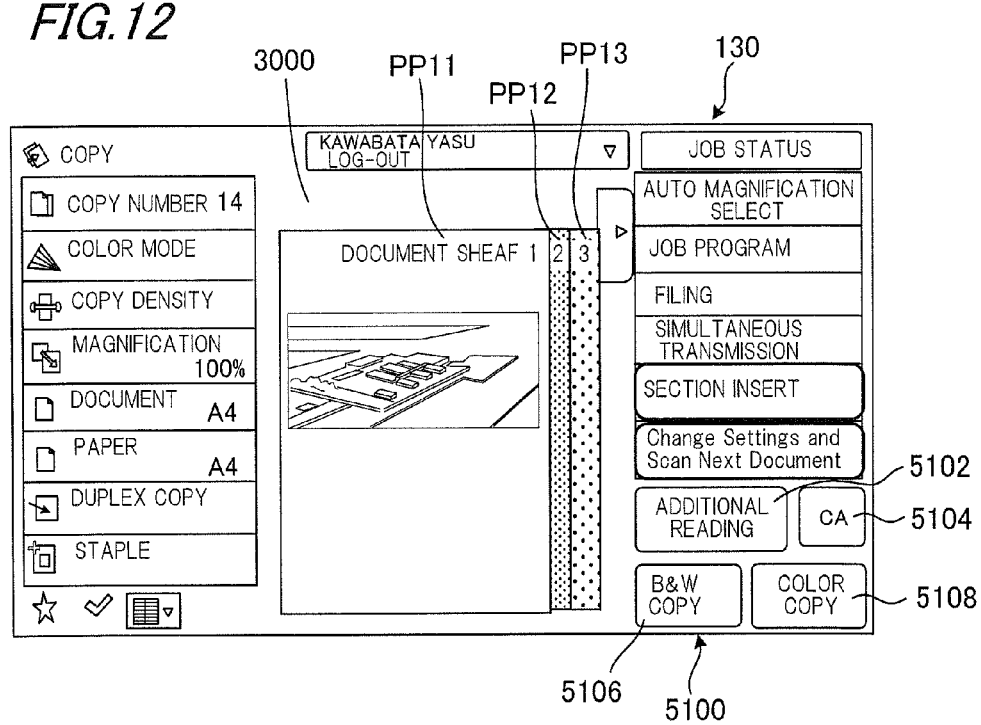
FIG. 12 is an illustrative view showing preview display of multiple document sheaves including additional document sheaves when a further additional reading operation is performed in example 1.

FIG. 10 is an illustrative view showing preview display of a document sheaf displayed on the touch panel display after a document reading operation in the image forming apparatus of example 1. FIG. 11 is an illustrative view showing preview display of multiple document sheaves including an additional document sheaf when an additional reading operation was performed after a document reading operation in example 1. FIG. 12 is an illustrative view showing preview display of multiple document sheaves including multiple additional document sheaves when a further additional reading operation was performed in example 1.

When documents to be copied are read in image forming apparatus 100, the user selects the copy mode in the home screen displayed on touch panel display 130 and touches scan-in key 5102 to start scanning of documents as shown in FIG. 7.

A plurality of documents of, for example A4 size are set in long-edge feed orientation in document reader 102.

When the documents are scanned by document reader 102, a display image of a document sheaf of multiple documents based on the image data of the scanned multiple documents is generated by display image generator 137 (FIG. 8), and the whole area of the front page of a first document sheaf image PP11 is displayed in the center of preview region 3000, as shown in FIG. 10. At this time, the image information on the whole surface of the front page of the scanned documents is displayed on the first document sheaf image PP11.

Next, when the user touches scan-in key 5102 to implement an additional reading operation, a second document sheaf image (additional document sheaf image) PP12 is generated by display image generator 137 as shown in FIG. 11, based on the image data of additionally scanned, multiple documents and displayed in preview region 3000.

The second document sheaf image PP12 is displayed in the same size as the first document sheaf image (previously scanned document sheaf) PP11 with respect to the predetermined reference directions, e.g., the height direction and/or width direction of touch panel display 130, document sheaf and the like.

The second document sheaf image PP12 is overlapped behind first document sheaf image PP11 so that part of it is hidden. That is, the second document sheaf image PP12 is laid out behind first document sheaf image PP11 with part of it exposed from behind the first document sheaf image PP11 so as to have the existence of second document sheaf image PP12 recognized.

When a further additional reading operation is executed by the user touching scan-in key 5102, a third document sheaf image (additional document sheaf image) PP13 is generated by display image generator 137 as shown in FIG. 12, based on the image data of additionally scanned, multiple documents and displayed in preview region 3000. The third document sheaf image PP13 is displayed in the same size as the first document sheaf image PP11 and the second document sheaf image PP12 and is overlapped behind second document sheaf image PP12 so that part of it is hidden. The third document sheaf image PP13 is laid behind second document sheaf image PP12 with part of it exposed from behind the second document sheaf image PP12 so as to have its existence recognized.

In this way, documents were scanned by document reader 102, and every time additional documents are scanned by document reader 102, a document sheaf image is generated, and the additional document sheaf image is successively laid behind the preview display of the document sheaves so that the document sheaves can be displayed in a preview representation on preview region 3000 in a distinctive manner.

Here, the preview image of each document sheaf in preview region 3000 may be classified by color or given with a name or number so that the user can distinguish more easily.

Next description will be made on a case where one of the document sheaves displayed on touch panel display 130 is selected and displayed.

Figure 13:
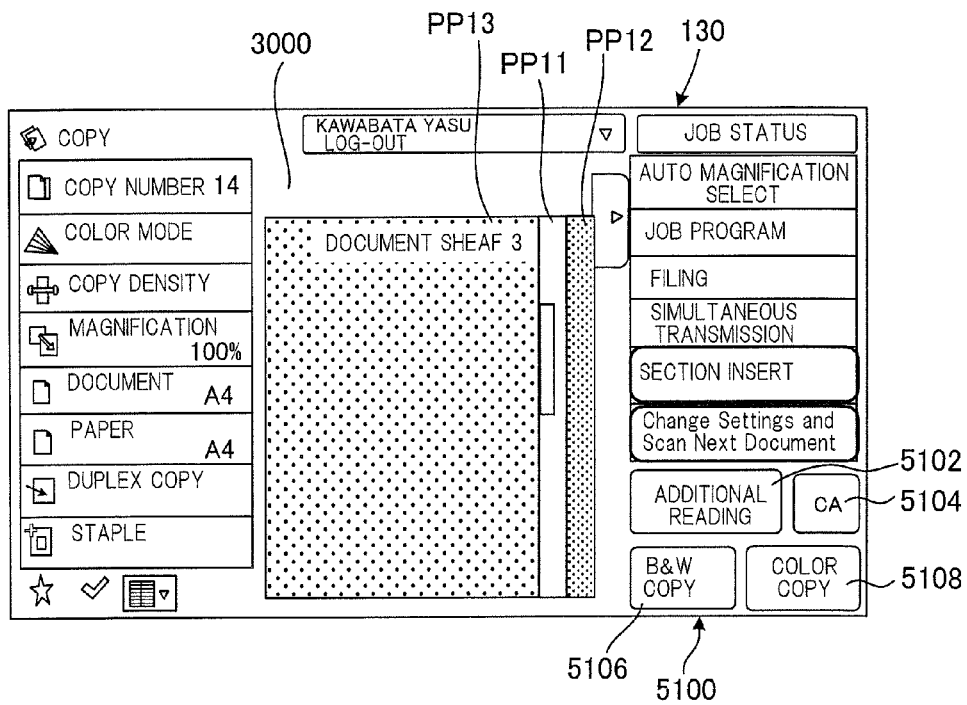
FIG. 13 is an illustrative view showing one example in which a desired document sheaf is selected and displayed on a touch panel display in an image forming apparatus of example 1.
Figure 14:
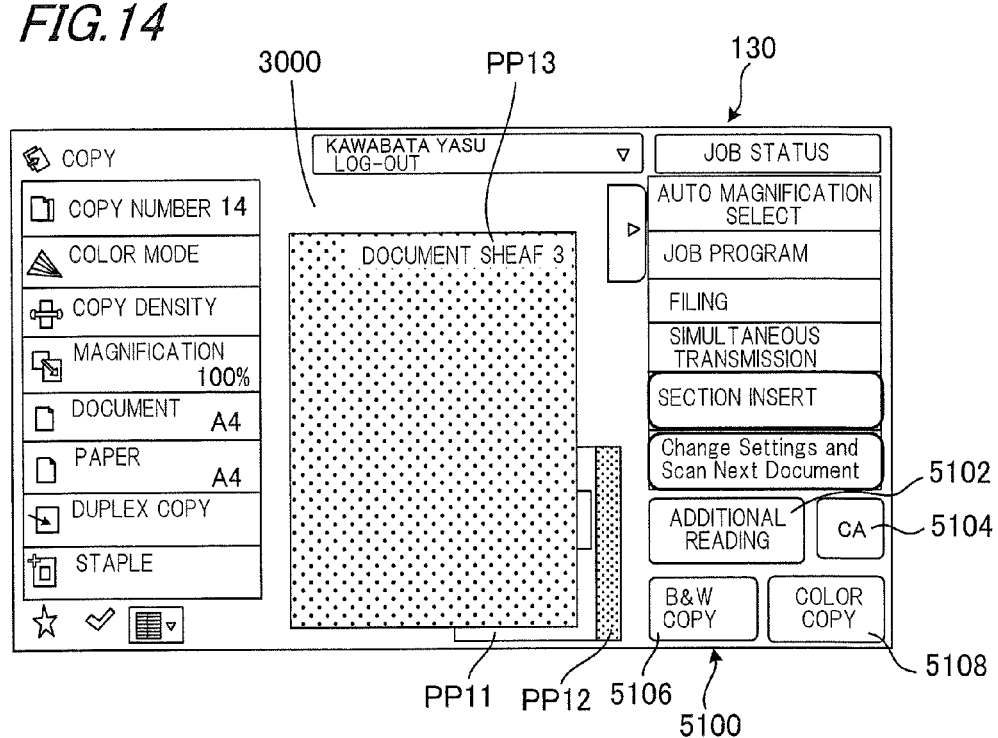
FIG. 14 is an illustrative view showing another example of document sheaves being displayed on the touch panel display.
Figure 15:
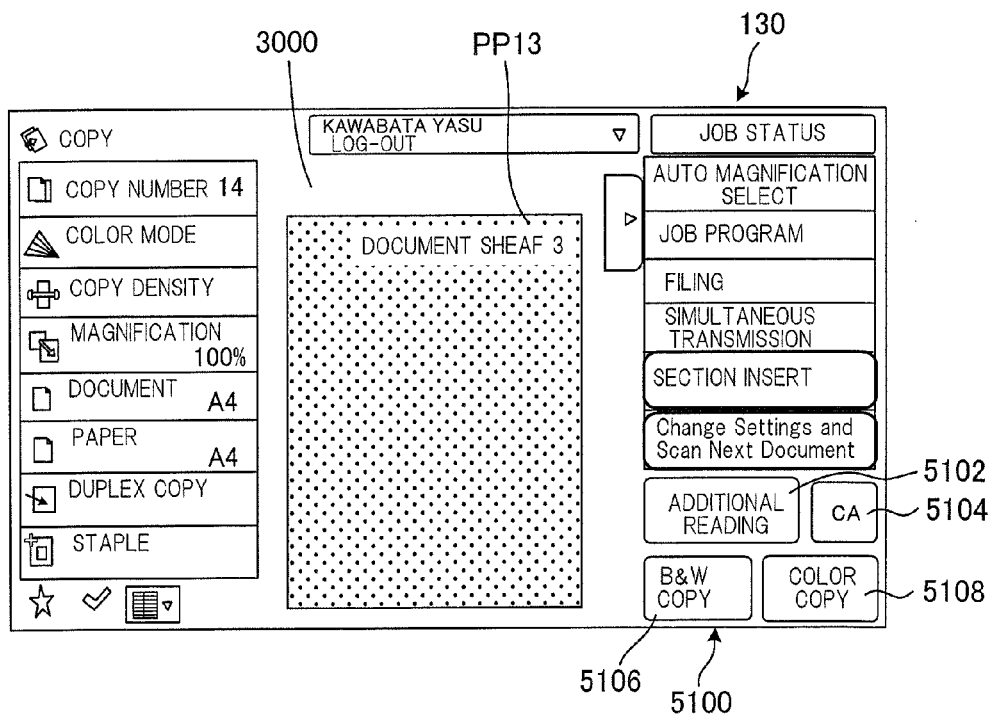
FIG. 15 is an illustrative view showing an example in which only a document sheaf selected on the touch panel display is displayed.

FIG. 13 is an illustrative view showing one example in which a desired document sheaf is selected and displayed on a touch panel display in the image forming apparatus of example 1. FIG. 14 is an illustrative view showing another example of document sheaves being displayed on the touch panel display. FIG. 15 is an illustrative view showing an example in which only a document sheaf selected on the touch panel display is displayed.

In example 1, when a desired document sheaf among a plurality of document sheaves displayed on touch panel display 130 is displayed, the user touches the target document sheaf image so that the touched document sheaf image is displayed fore-most in the normal size.

For example, when the whole area of the front page of third document sheaf PP13 is wanted to be displayed from the state shown in FIG. 12, the user touches the preview image of third document sheaf PP13 on touch panel display 130. Then, the whole area of the front page of third document sheaf PP13 is displayed fore-most while the first document sheaf image PP11 and second document sheaf image PP12 are moved behind third document sheaf image PP13, as shown in FIG. 13 so that they are displayed with part of them hidden behind third document sheaf image PP13.

As another display example, as shown in FIG. 14, when the third document sheaf image PP13 is displayed fore-most, first document sheaf image PP11 and second document sheaf image PP12 may be reduced in size and displayed so as to be smaller with respect to the predetermined reference directions than the display size of third document sheaf image PP13, and moved behind third document sheaf image PP13 and displayed with part of them hidden behind third document sheaf image PP13. At this time, first document sheaf image PP11 and second document sheaf image PP12 may be displayed at the lower right of the preview display of third document sheaf PP13 with part of them exposed from behind third document sheaf image PP13.

As still another display example, as shown in FIG. 15, third document sheaf image PP13 alone may be displayed in the normal size or in an enlarged size on preview region 3000 while the preview display of first document sheaf PP11 and second document sheaf PP12 may be omitted.

Example 2

Example 2 illustrates a configuration of image forming apparatus 100 in which when plural sheaves of documents are given in a preview representation by document-sheaf display controller 1311 of control unit-side controller 131, the display image of an additional sheaf of documents is laid out in front of the display image of the previously scanned document sheaf with part of the display image of the previously scanned document sheaf overlapped and hidden.

Figure 16:
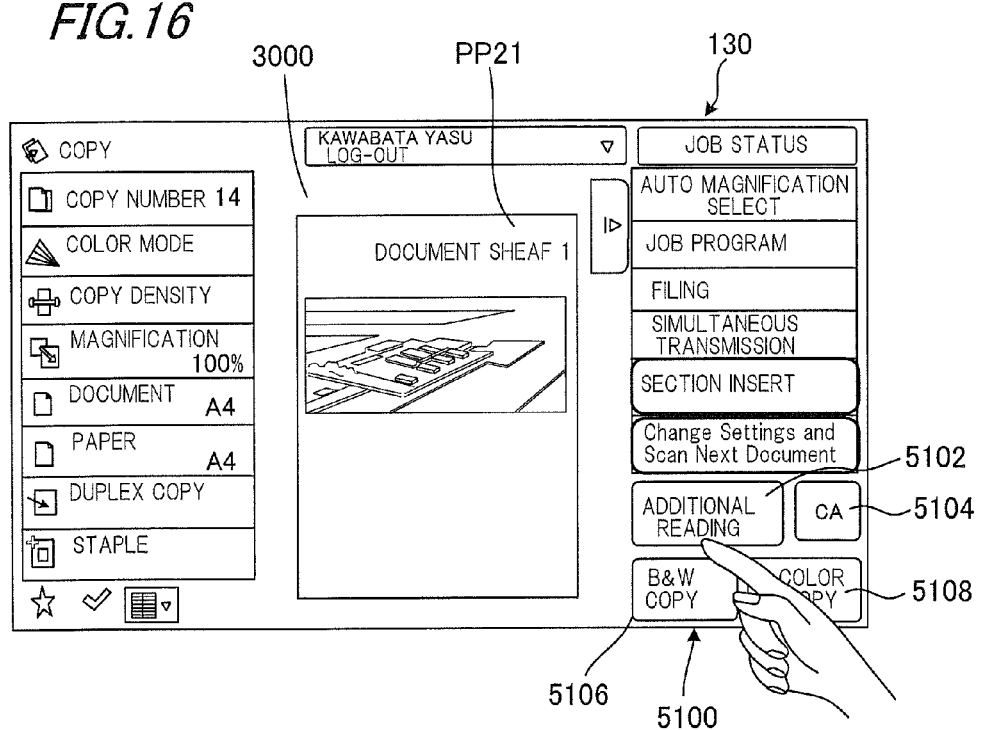
FIG. 16 is an illustrative view showing preview display of a document sheaf displayed on a touch panel display after a document reading operation in an image forming apparatus of example 2.
Figure 17:
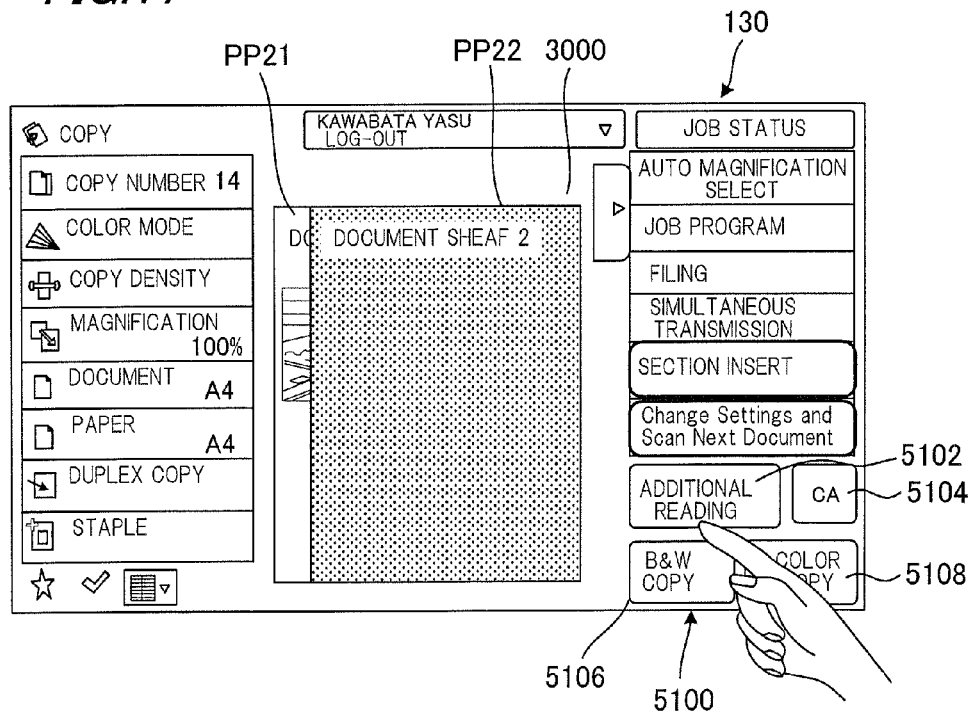
FIG. 17 is an illustrative view showing preview display of multiple document sheaves including an additional document sheaf when an additional reading operation is performed after a document reading operation in example 2.
Figure 18:
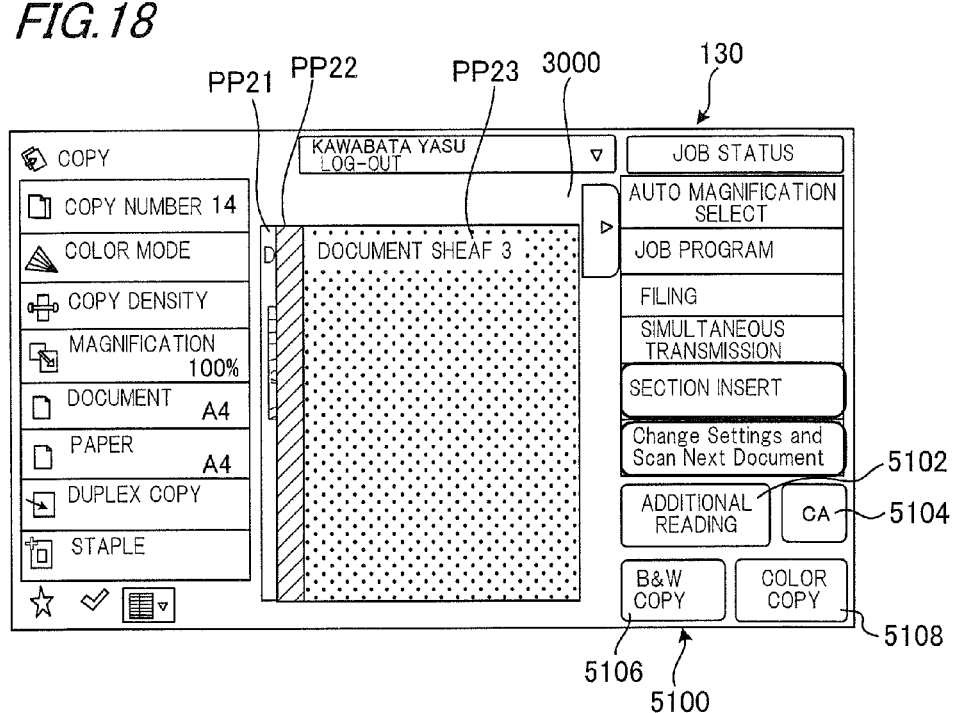
FIG. 18 is an illustrative view showing preview display of multiple document sheaves including additional document sheaves when a further additional reading operation is performed in example 2.

FIG. 16 is an illustrative view showing preview display of a document sheaf displayed on the touch panel display after a document reading operation in the image forming apparatus of example 2. FIG. 17 is an illustrative view showing preview display of multiple document sheaves including an additional document sheaf when an additional reading operation was performed after a document reading operation in example 2. FIG. 18 is an illustrative view showing preview display of multiple document sheaves including multiple additional document sheaves when a further additional reading operation was performed in example 2.

As the user touches scan-in key 5102 to implement scanning of documents by means of document reader 102, a display image of a document sheaf of multiple documents based on the image data of the scanned multiple documents, is generated by display image generator 137, so that a first document sheaf image PP21 is displayed in the center of preview region 3000, as shown in FIG. 16. At this time, the image information on the whole area of the front page of the scanned documents is displayed on the first document sheaf image PP21.

Next, when the user touches scan-in key 5102 to implement an additional reading operation, a second document sheaf image (additional document sheaf image) PP22 is generated by display image generator 137 as shown in FIG. 17, based on the image data of additionally scanned, multiple documents and displayed in preview region 3000.

The second document sheaf image PP22 is displayed in the same size as the first document sheaf image PP21 with respect to the predetermined reference directions, and is overlapped in front of first document sheaf image PP21 so as to hide part of the first document sheaf image. That is, the whole area of image information on the front page of the scanned, second document sheaf is displayed on the second document sheaf image PP22. The first document sheaf PP21 is arranged so that part of it is exposed from behind the second document sheaf PP22 so as to have its existence recognized.

When a further additional reading operation is executed by the user touching scan-in key 5102, a third document sheaf image (additional document sheaf image) PP23 is generated by display image generator 137 as shown in FIG. 18, based on the image data of additionally scanned, multiple documents and displayed in preview region 3000. The third document sheaf image PP23 is displayed in the same size as the first document sheaf image PP21 and the second document sheaf image PP22 with respect to the predetermined reference directions and is overlapped in front of second document sheaf image PP22 so that part of second document sheaf image PP22 is hidden. That is, the whole area of image information on the front page of the scanned, third document sheaf is displayed on the third document sheaf image PP23. The second document sheaf PP22 is arranged so that part of it is exposed from behind the third document sheaf PP23 so as to have its existence recognized.

In this way, documents were scanned by document reader 102, and every time additional documents are scanned by document reader 102, a document sheaf image is generated and the additional document sheaf image is successively laid over, and hides, part of the display image of the previously scanned document sheaf so that the previously scanned sheaf can be displayed in a preview representation on preview region 3000, in a distinctive manner.

Here, the preview image of each document sheaf in preview region 3000 may be classified by color or given with a name or number so that the user can distinguish more easily.

Next description will be made on a case where one of the document sheaves displayed on touch panel display 130 is selected and displayed.

Figure 19:
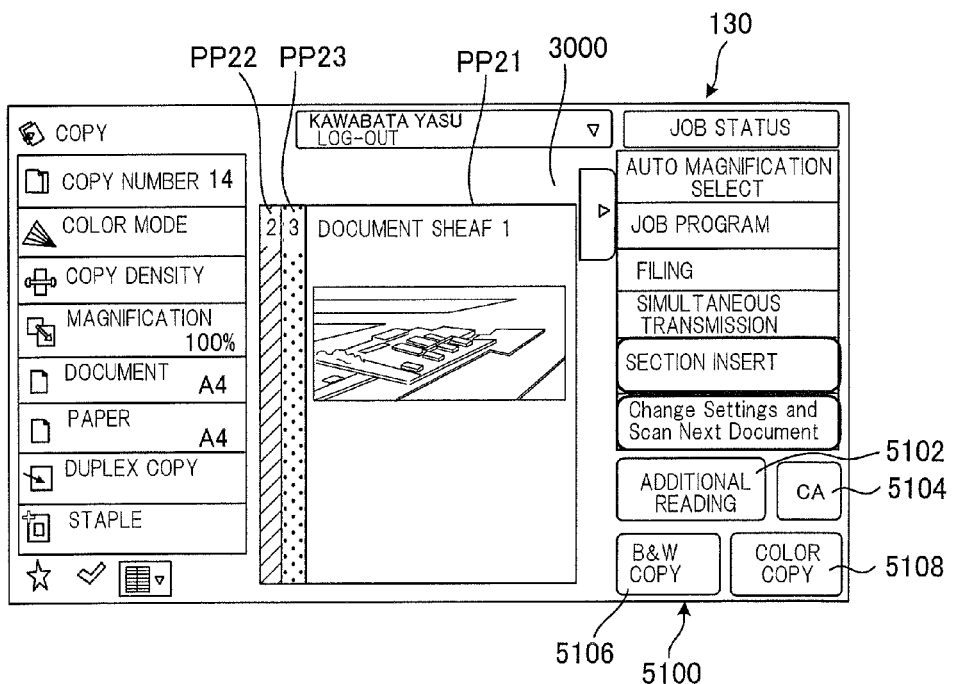
FIG. 19 is an illustrative view showing one example in which a desired document sheaf is selected and displayed on a touch panel display in an image forming apparatus of example 2.
Figure 20:
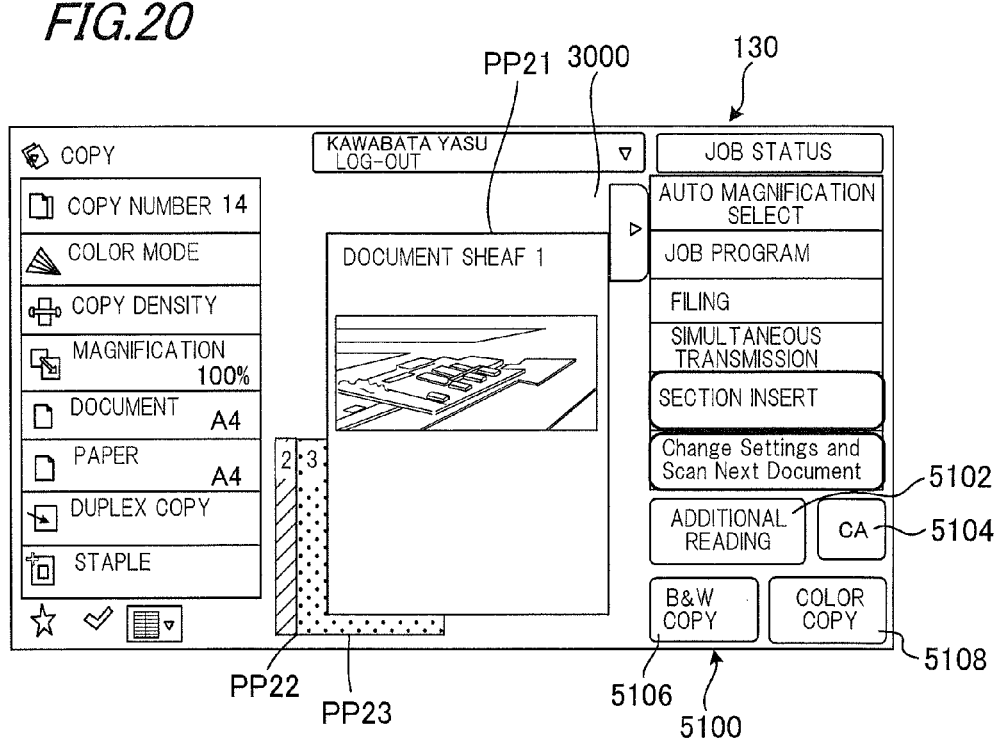
FIG. 20 is an illustrative view showing another example of document sheaves being displayed on the touch panel display.
Figure 21:
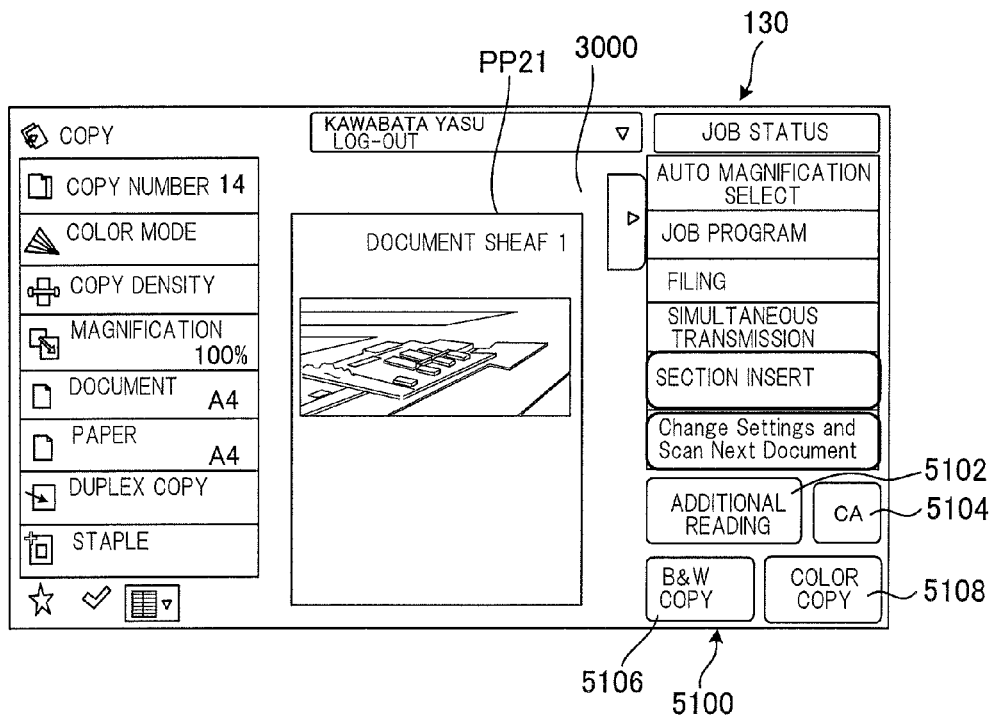
FIG. 21 is an illustrative view showing an example in which only a document sheaf selected on the touch panel display is displayed.

FIG. 19 is an illustrative view showing one example in which a desired document sheaf is selected and displayed on the touch panel display in the image forming apparatus of example 2. FIG. 20 is an illustrative view showing another example of document sheaves being displayed on the touch panel display. FIG. 21 is an illustrative view showing an example in which only a document sheaf selected on the touch panel display is displayed.

In example 2, when a desired document sheaf among a plurality of document sheaves displayed on touch panel display 130 is displayed, the user touches the target document sheaf image so that the touched document sheaf image is displayed fore-most in the normal size.

For example, when the whole area of the front page of first document sheaf PP21 is wanted to be displayed from the state shown in FIG. 18, the user touches the preview image of first document sheaf PP21 on touch panel display 130. Then, the whole area of the front page of first document sheaf PP21 is displayed fore-most while the second document sheaf image PP22 and third document sheaf image PP23 move behind first document sheaf image PP21 as shown in FIG. 19 so that they are displayed with part of them hidden behind first document sheaf image PP21.

As another display example, as shown in FIG. 20, when the first document sheaf image PP21 is displayed fore-most, second document sheaf image PP22 and third document sheaf image PP23 may be reduced in size and moved behind first document sheaf image PP21. At this time, second document sheaf image PP22 and third document sheaf image PP23 may be displayed at the lower left of the preview display of first document sheaf PP21 with part of them exposed from behind first document sheaf image PP21.

As still another display example, as shown in FIG. 21, first document sheaf image PP21 alone may be displayed in the normal size or in an enlarged size on preview region 3000 while the preview display of second document sheaf PP22 and third document sheaf PP23 may be omitted.

Example 3

Example 3 illustrates a configuration of image forming apparatus 100 in which when plural sheaves of documents are given in a preview representation by document-sheaf display controller 1311 of control unit-side controller 131, the display image of an additional sheaf of documents is laid out in front of the display image of the previously scanned document sheaf with part of the display image of the previously scanned document sheaf overlapped and hidden while the display image of the previously scanned document sheaf is reduced in size and overlapped and displayed behind the display image of the additional document sheaf.

Figure 22:
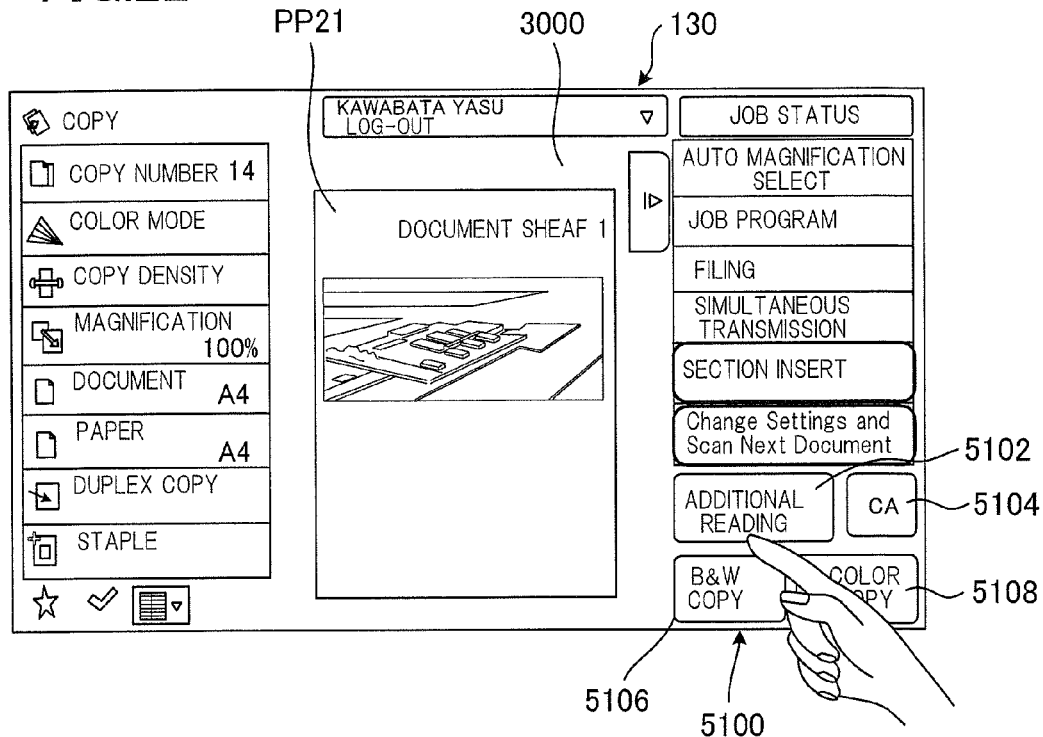
FIG. 22 is an illustrative view showing preview display of a document sheaf displayed on a touch panel display after a document reading operation in an image forming apparatus of example 3.
Figure 23:
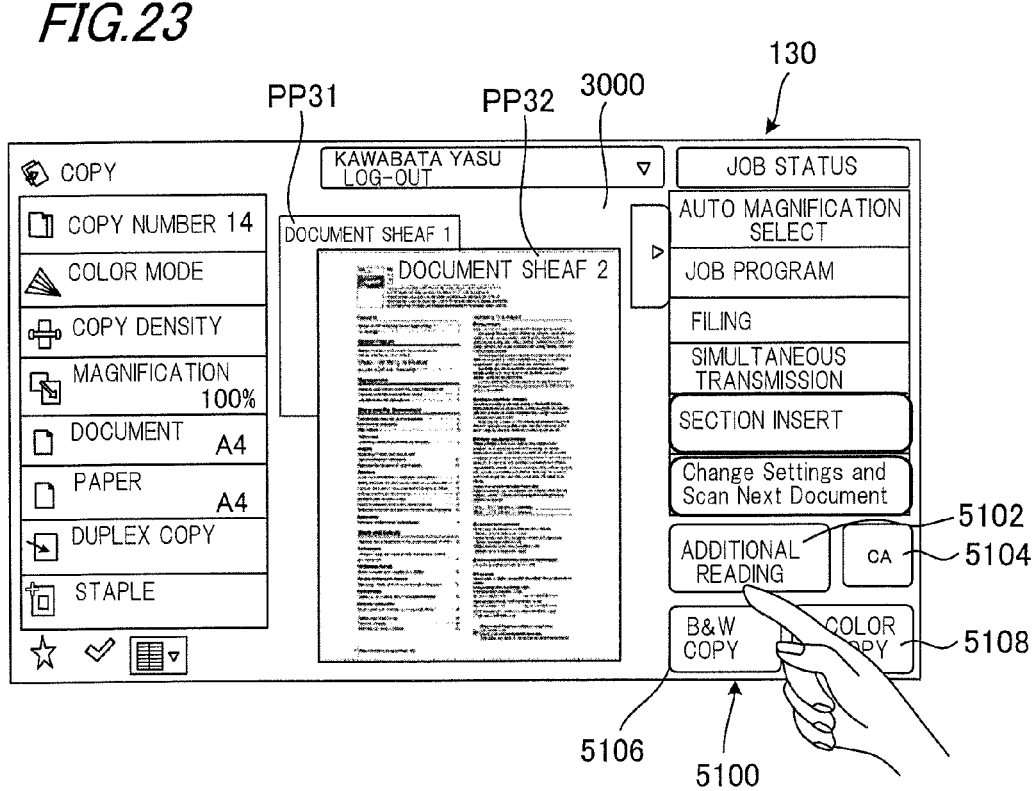
FIG. 23 is an illustrative view showing preview display of multiple document sheaves including an additional document sheaf when an additional reading operation is performed after a document reading operation in example 3.
Figure 24:
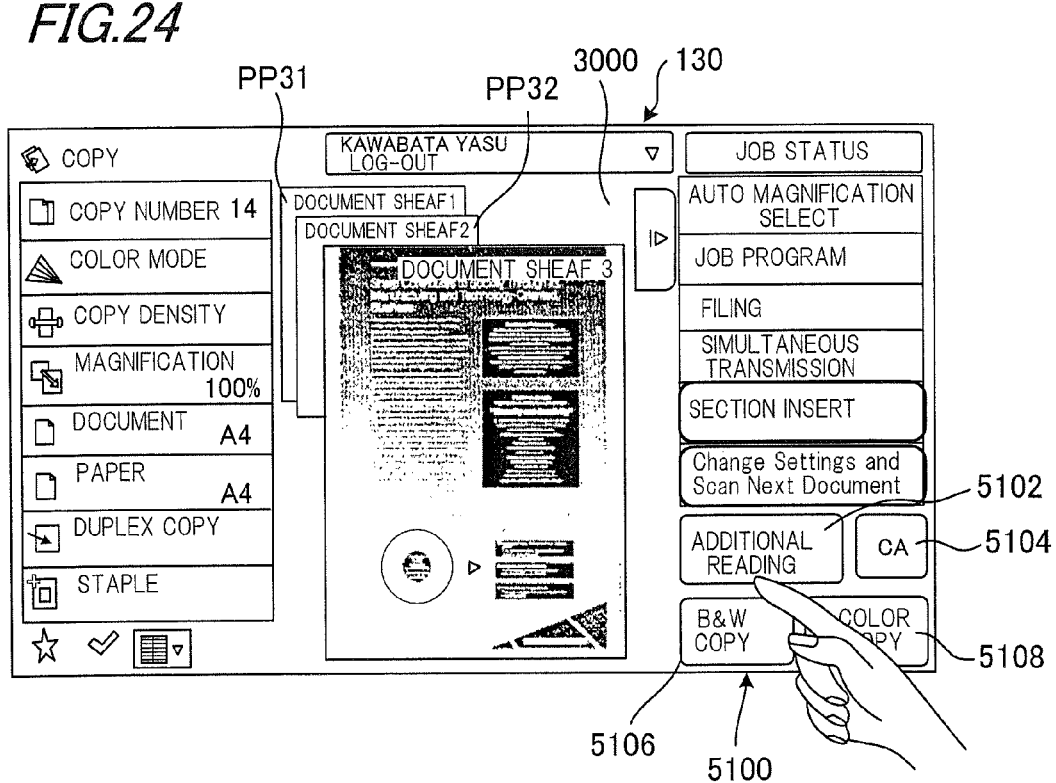
FIG. 24 is an illustrative view showing preview display of multiple document sheaves including additional document sheaves when a further additional reading operation is performed in example 3.

FIG. 22 is an illustrative view showing preview display of a document sheaf displayed on the touch panel display after a document reading operation in the image forming apparatus of example 3. FIG. 23 is an illustrative view showing preview display of multiple document sheaves including an additional document sheaf when an additional reading operation was performed after a document reading operation in example 3. FIG. 24 is an illustrative view showing preview display of multiple document sheaves including multiple additional document sheaves when a further additional reading operation was performed in example 3.

As the user touches scan-in key 5102 to implement scanning of documents by means of document reader 102, a display image of a document sheaf of multiple documents based on the image data of the scanned multiple documents is generated by display image generator 137, so that the whole area of the front page of a first document sheaf image PP31 is displayed in the center of preview region 3000, as shown in FIG. 22. At this time, the image information on the whole area of the front page of the scanned documents is displayed on the first document sheaf image PP31.

Next, when the user touches scan-in key 5102 to implement an additional reading operation, a second document sheaf image (additional document sheaf image) PP32 is generated by display image generator 137 as shown in FIG. 23, based on the image data of additionally scanned, multiple documents and displayed in preview region 3000. The second document sheaf image PP32 is overlapped in front of first document sheaf image PP31 so as to hide part of the first document sheaf image. The first document sheaf PP31 is reduced in size so as to be smaller than second document sheaf PP32 with respect to the predetermined reference directions, and is moved to the upper left behind the second document sheaf PP32 so that part of it is exposed from behind the second document sheaf PP32 so as to have its existence recognized.

When a further additional reading operation is executed by the user touching scan-in key 5102, a third document sheaf image (additional document sheaf image) PP33 is generated by display image generator 137 as shown in FIG. 24, based on the image data of additionally scanned, multiple documents and displayed in preview region 3000. The third document sheaf image PP33 is overlapped in front of second document sheaf image PP32 so as to hide part of the second document sheaf image. The second document sheaf PP32 is reduced in size, similarly to the first document sheaf PP31 so as to be smaller than third document sheaf PP33 with respect to the predetermined reference directions, and is moved to the upper left behind the third document sheaf PP33 so that part of it is exposed from behind the third document sheaf PP33 so as to have its existence recognized.

In this way, documents were scanned by document reader 102, and every time additional documents are scanned by document reader 102, a document sheaf image is generated and the additional document sheaf image is successively laid over, and hides, part of the display image of the previously scanned document sheaf so that the previously scanned sheaf can be displayed in a preview representation on preview region 3000, in a distinctive manner.

Here, similarly to examples 1 and 2 the preview display image of each document sheaf in preview region 3000 may be classified by color or given with a name or number so that the user can distinguish more easily.

Next description will be made on a case where one of the document sheaves displayed on touch panel display 130 is selected and displayed.

Figure 25:
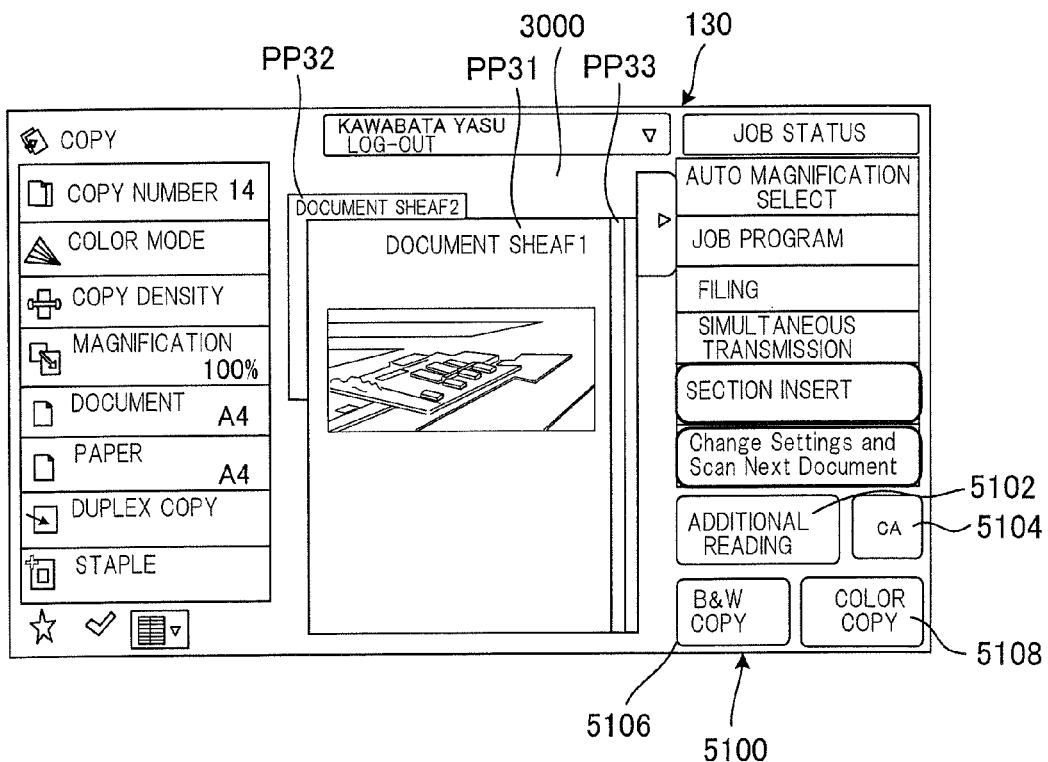
FIG. 25 is an illustrative view showing one example in which a desired document sheaf is selected and displayed on a touch panel display in an image forming apparatus of example 3.
Figure 26:
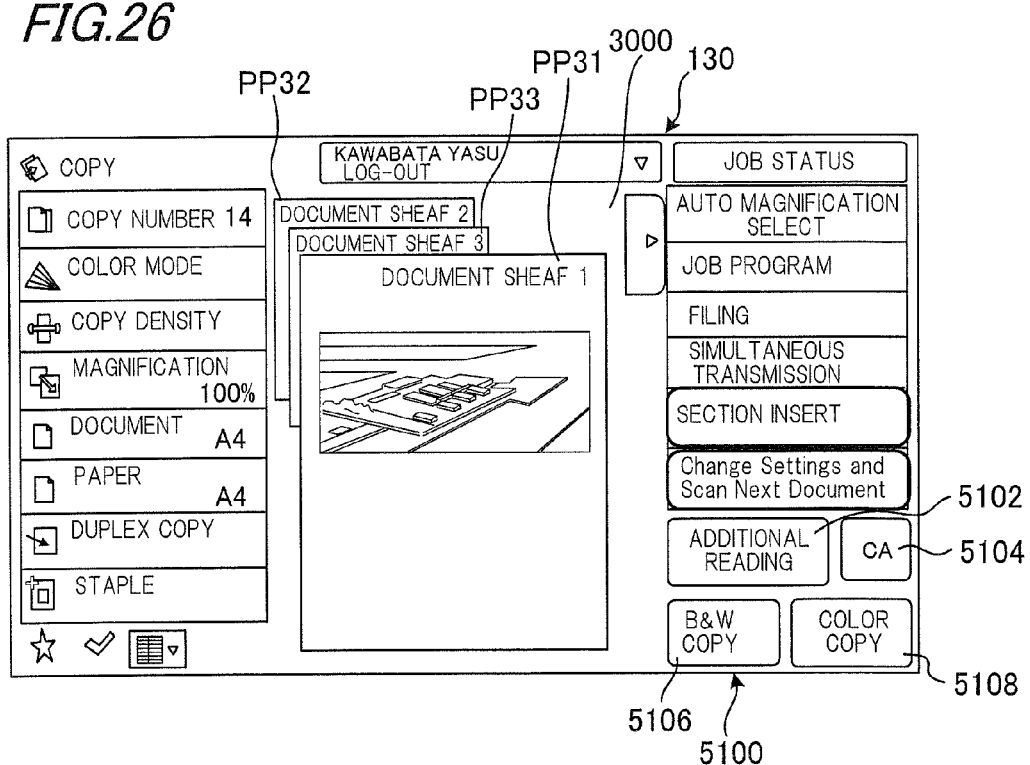
FIG. 26 is an illustrative view showing another example of document sheaves being displayed on the touch panel display.
Figure 27:
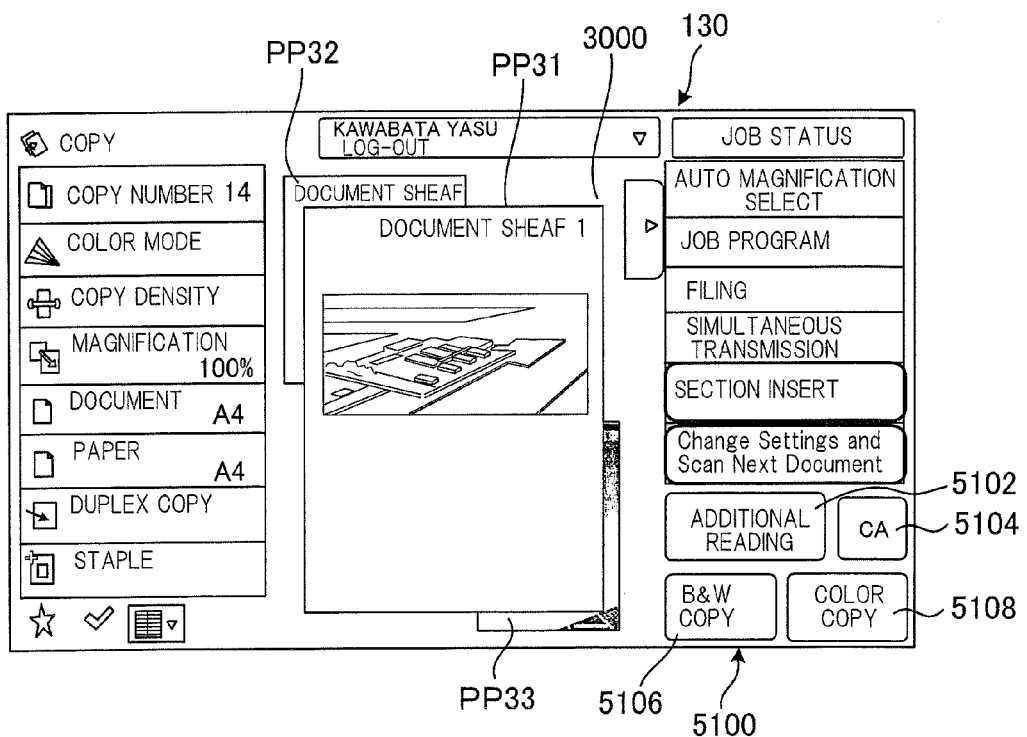
FIG. 27 is an illustrative view showing another example of document sheaves being displayed on the touch panel display.
Figure 28:
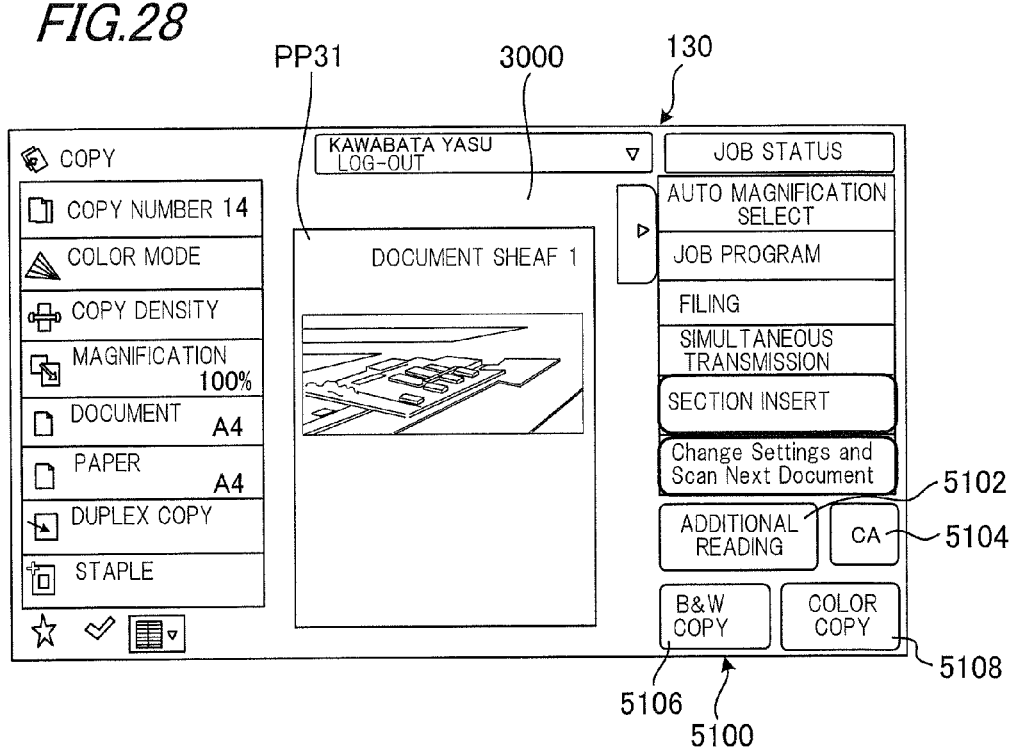
FIG. 28 is an illustrative view showing an example in which only a document sheaf selected on the touch panel display is displayed.

FIG. 25 is an illustrative view showing one example in which a desired document sheaf is selected and displayed on the touch panel display in the image forming apparatus of example 3. FIGS. 26 and 27 are illustrative views showing other examples of document sheaves being displayed on the touch panel display. FIG. 28 is an illustrative view showing an example in which only a document sheaf selected on the touch panel display is displayed.

In example 3, when a desired document sheaf among a plurality of document sheaves displayed on touch panel display 130 is displayed, the user touches the target document sheaf image so that the touched document sheaf image is displayed fore-most in the normal size.

For example, when the whole area of the front page of first document sheaf PP31 is wanted to be displayed from the state shown in FIG. 24, the user touches the preview image of first document sheaf PP31 on touch panel display 130. Then, the whole area of the front page of first document sheaf PP31 is enlarged and displayed fore-most in front of the third document sheaf PP33, as shown in FIG. 25. The second document sheaf PP32 and the third document sheaf PP33 are moved behind first document sheaf image PP31 as they are, so that they are displayed with part of them hidden behind first document sheaf image PP31.

As another display example, as shown in FIG. 26, when the first document sheaf image PP31 is displayed fore-most, the third document sheaf image PP33 may be reduced in size and moved behind the first document sheaf PP31 and laid over in front of the second document sheaf image PP32.

As a further display example, as shown in FIG. 27, when the first document sheaf image PP31 is displayed fore-most, the third document sheaf image PP33 may be reduced in size and moved to the lower right behind the first document sheaf PP31 so that part of the third document sheaf image PP33 is exposed from the first document sheaf PP31.

As still another display example, as shown in FIG. 28, first document sheaf image PP31 alone may be displayed in the normal size or in an enlarged size on preview region 3000 while the preview display of second document sheaf PP32 and third document sheaf PP33 may be omitted.

Example 4

Example 4 illustrates a configuration of image forming apparatus 100 in which when plural sheaves of documents are given in a preview representation by document-sheaf display controller 1311 of control unit-side controller 131, an icon corresponding to the display image of the previously scanned document sheaf is prepared by small-sized image preparation controller 1312 so that the prepared icon is displayed around the display image of an additional document sheaf by small-sized image display controller 1313. Here, the icon is a representation that is symbolized by a simple picture of the display image of a document sheaf, and the picture is not particularly limited.

Figure 29:
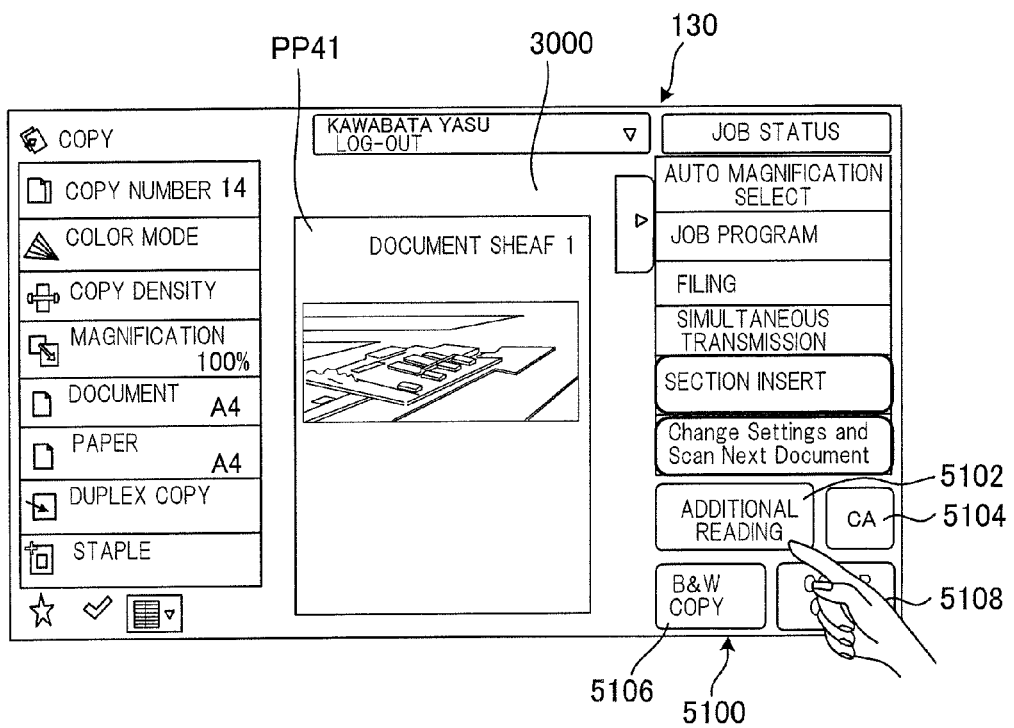
FIG. 29 is an illustrative view showing preview display of a document sheaf displayed on a touch panel display after a document reading operation in an image forming apparatus of example 4.
Figure 30:
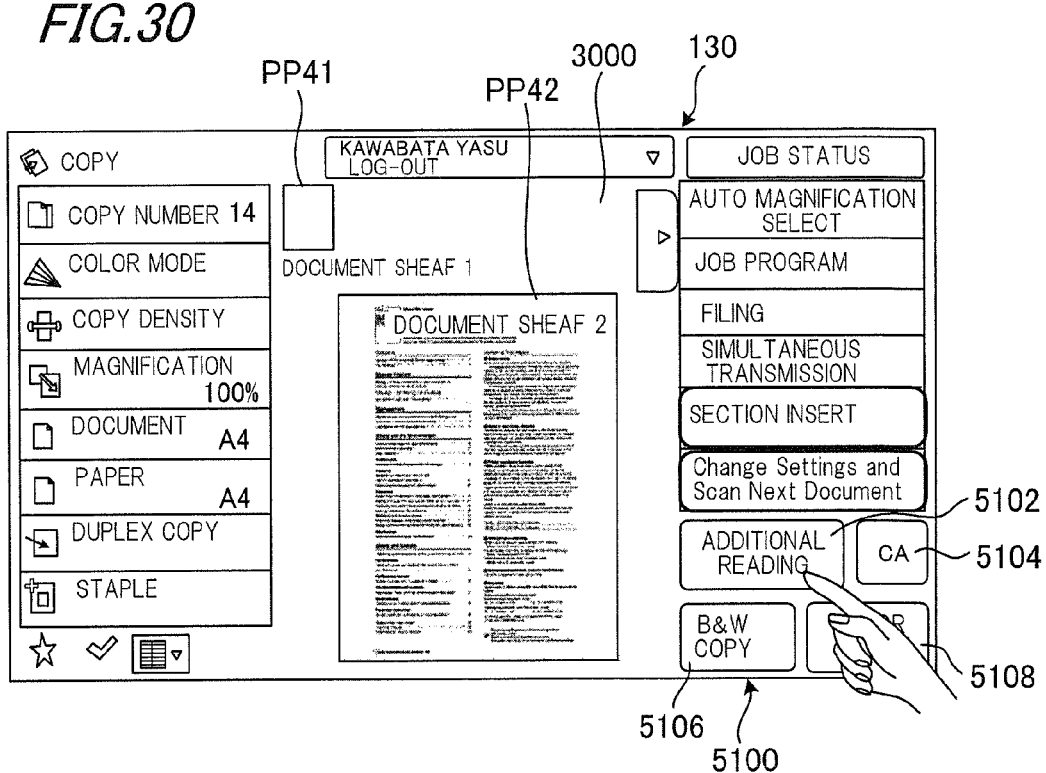
FIG. 30 is an illustrative view showing preview display of an additional document sheaf when an additional reading operation is performed after a document reading operation in example 4.
Figure 31:
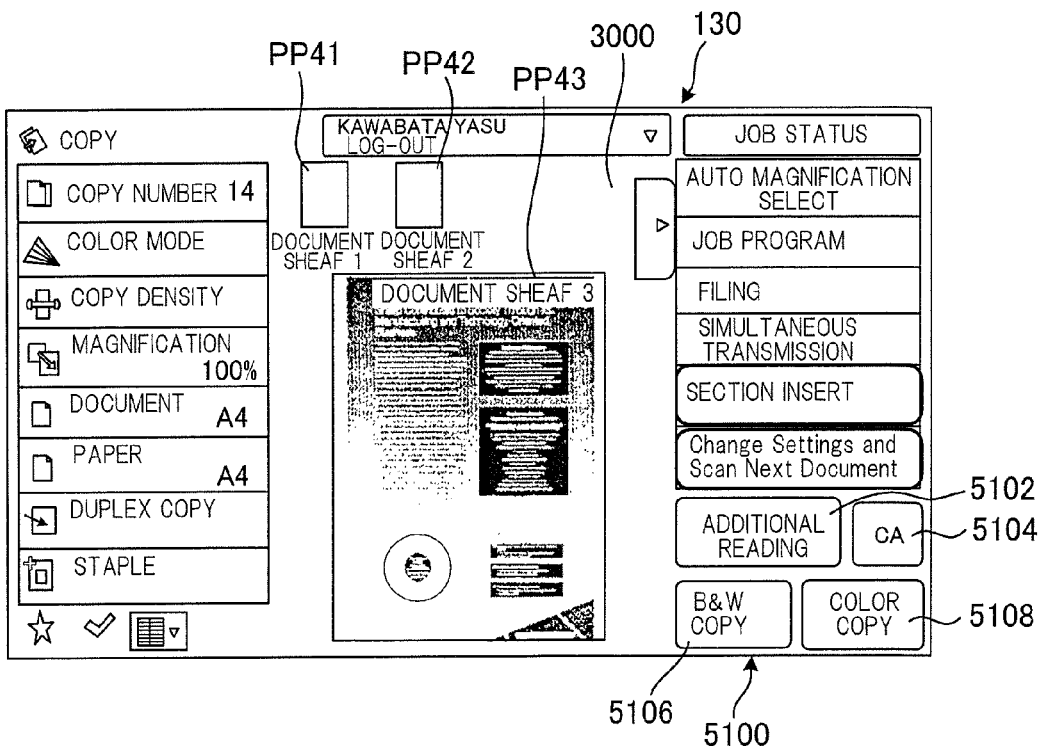
FIG. 31 is an illustrative view showing preview display of an additional document sheaf when a further additional reading operation is performed in example 4.

FIG. 29 is an illustrative view showing preview display of a document sheaf displayed on the touch panel display after a document reading operation in the image forming apparatus of example 4. FIG. 30 is an illustrative view showing preview display of an additional document sheaf when an additional reading operation was performed after a document reading operation in example 4. FIG. 31 is an illustrative view showing preview display of an additional document sheaf when a further additional reading operation was performed in example 4.

As the user touches scan-in key 5102 to implement scanning of documents by means of document reader 102, a display image of a document sheaf of multiple documents based on the image data of the scanned multiple documents is generated by display image generator 137, so that the whole area of the front page of a first document sheaf image PP41 is displayed in the center of preview region 3000, as shown in FIG. 29. At this time, the image information on the whole area of the front page of the scanned documents is displayed on the first document sheaf image PP41.

Next, when the user touches scan-in key 5102 to implement an additional reading operation, a second document sheaf image (additional document sheaf image) PP42 is generated by display image generator 137 as shown in FIG. 30, based on the image data of additionally scanned, multiple documents and the whole area of the front page is displayed in preview region 3000. On the other hand, the first document sheaf PP41 is displayed as an icon. That is, a first icon PA41 corresponding to the first document sheaf PP41 is prepared by small-sized image preparation controller 1312, and displayed instead of first document sheaf PP41. The first icon PA41 is displayed at a position upper left of second document sheaf PP42.

When a further additional reading operation is executed by the user touching scan-in key 5102, a third document sheaf image (additional document sheaf image) PP43 is generated by display image generator 137 as shown in FIG. 31, based on the image data of additionally scanned, multiple documents and the whole area of the front page is displayed in preview region 3000. On the other hand, the second document sheaf PP42 is displayed as an icon, similarly to the first document sheaf PP41. That is, a second icon PA42 corresponding to the second document sheaf PP42 is prepared by small-sized image preparation controller 1312 is displayed instead of second document sheaf PP42. The second icon PA41 is displayed at a position next to first icon PA41 and upper left of third document sheaf PP43.

In this way, documents were scanned by document reader 102, and every time additional documents are scanned by document reader 102, a document sheaf image is generated and only the image of the last document sheaf that has been additionally scanned is displayed such that the whole area of the front page is given in a preview representation in preview region 3000 while the previously scanned document sheaves are iconized and displayed, side by side, above the last document sheaf. With this, it is possible to distinguish between multiple document sheaves.

Here, similarly to examples 1 and 2 the preview display image of each iconized document sheaf in preview region 3000 may be classified by color or given with a name or number so that the user can distinguish more easily. Further, the iconized document sheaves may be displayed with a low brightness compared to the normal display of document sheaf so as to clarify them from the document sheaf being displayed.

Next description will be made on a case where one of the document sheaves displayed on touch panel display 130 is selected and displayed.

Figure 32:
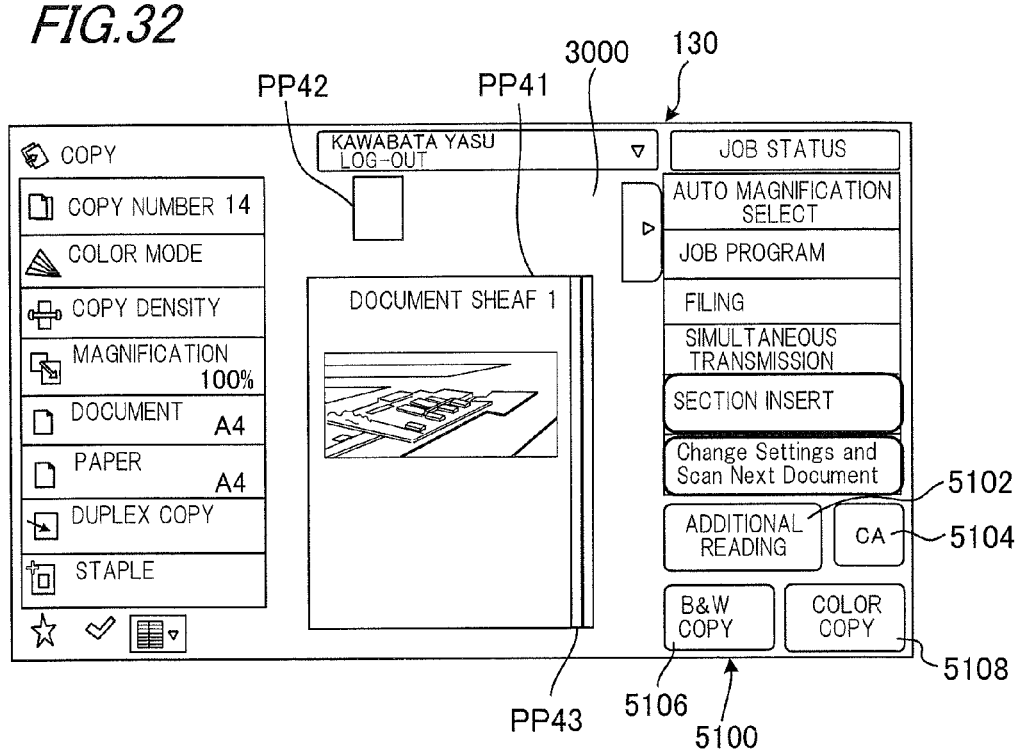
FIG. 32 is an illustrative view showing one example in which a desired document sheaf is selected and displayed on a touch panel display in an image forming apparatus of example 4.
Figure 33:
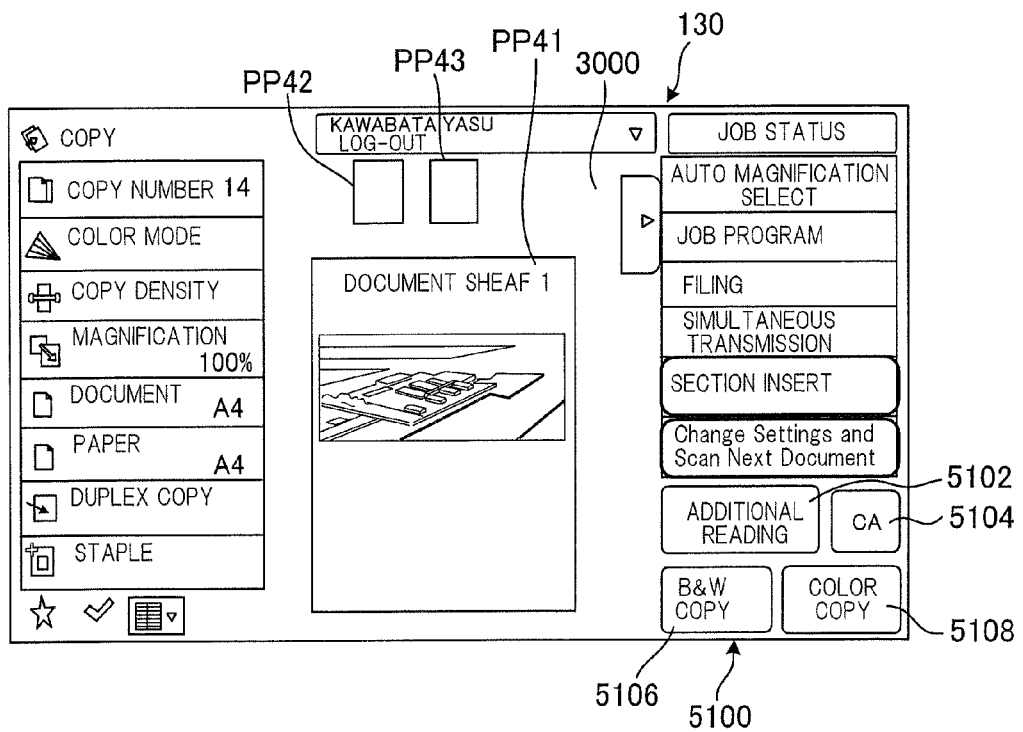
FIG. 33 is an illustrative view showing another example of document sheaves being displayed on the touch panel display.
Figure 34:
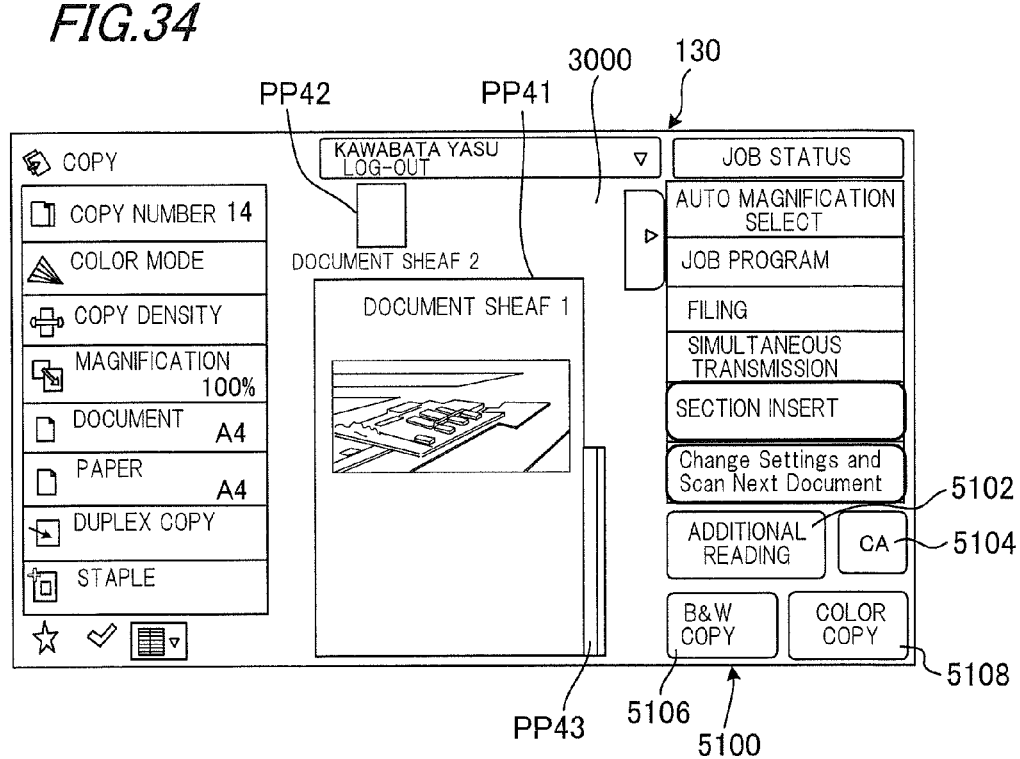
FIG. 34 is an illustrative view showing another example of document sheaves being displayed on the touch panel display.
Figure 35:
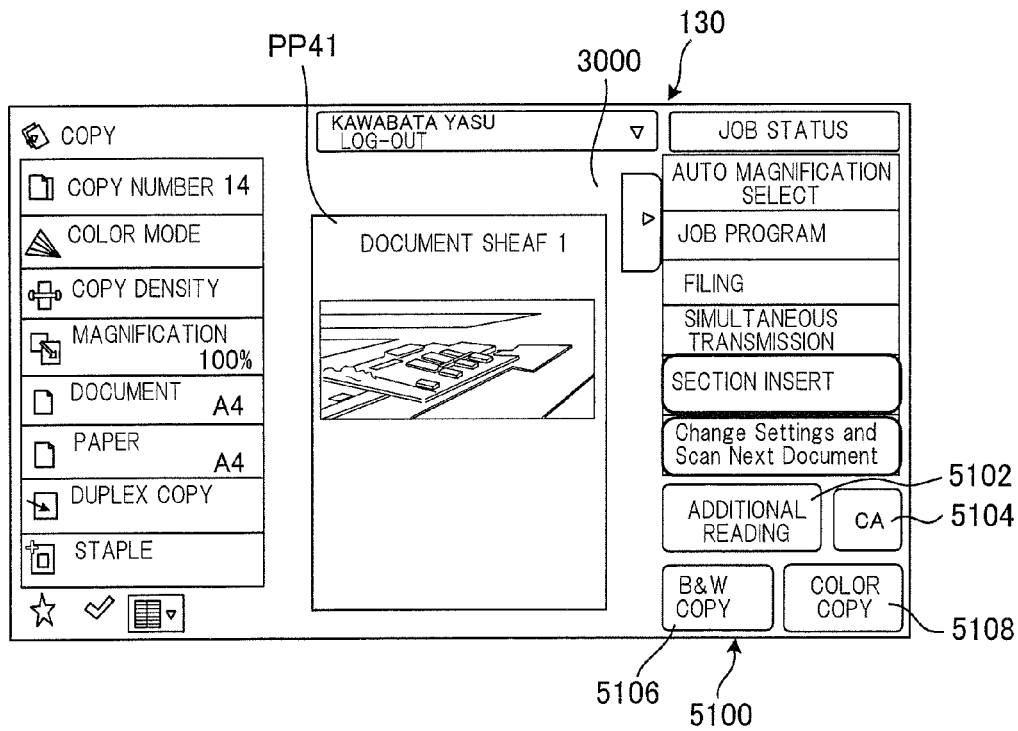
FIG. 35 is an illustrative view showing an example in which only a document sheaf selected on the touch panel display is displayed.

FIG. 32 is an illustrative view showing one example in which a desired document sheaf is selected and displayed on the touch panel display in the image forming apparatus of example 4. FIGS. 33 and 34 are illustrative views showing other examples of document sheaves being displayed on the touch panel display. FIG. 35 is an illustrative view showing an example in which only a document sheaf selected on the touch panel display is displayed.

In example 4, when the whole area of the front page of a desired document sheaf among a plurality of iconized document sheaves displayed on touch panel display 130 is displayed, the user touches the icon of the target document sheaf so that the touched icon is enlarged to be the normal document sheaf image and the whole area of its front page is displayed.

For example, when the whole area of the front page of first document sheaf PP41 is wanted to be displayed from the state shown in FIG. 31, the user touches first icon PA41 on touch panel display 130. Then, the first icon PA41 is enlarged so that the whole area of the front page of first document sheaf PP41 is laid over, and displayed in front of, the third document sheaf PP43, as shown in FIG. 32.

As another display example, as shown in FIG. 33, when the whole area of the front page of first document sheaf PP41 is displayed, the third document sheaf PP43 may be iconized so that third icon PA43 is displayed next to second icon PA42.

As a further display example, as shown in FIG. 34, when the first document sheaf image PP41 is displayed, the third document sheaf image PP43 may be reduced in size and moved to the lower right behind the first document sheaf PP41 so that part of the third document sheaf image PP43 is exposed from the first document sheaf PP41.

As still another display example, as shown in FIG. 35, first document sheaf image PP41 alone may be displayed in the normal size or in an enlarged size on preview region 3000 while second icon PA42 and third icon PA43 may be omitted.

Example 5

Example 5 illustrates a configuration of image forming apparatus 100 in which when plural sheaves of documents are given in a preview representation by document-sheaf display controller 1311 of control unit-side controller 131, a folder for storing the display images of previously scanned document sheaves is prepared so that folder storage controller 1315 controls to store a document sheaf into the prepared folder while folder display controller 1316 displays the folder around the display image of an additional document sheaf that is preview-displayed in preview region 3000 on touch panel display 130. Here, the folder is an icon that represents a file for storing document sheaves, and the picture is not particularly limited.

Figure 36:
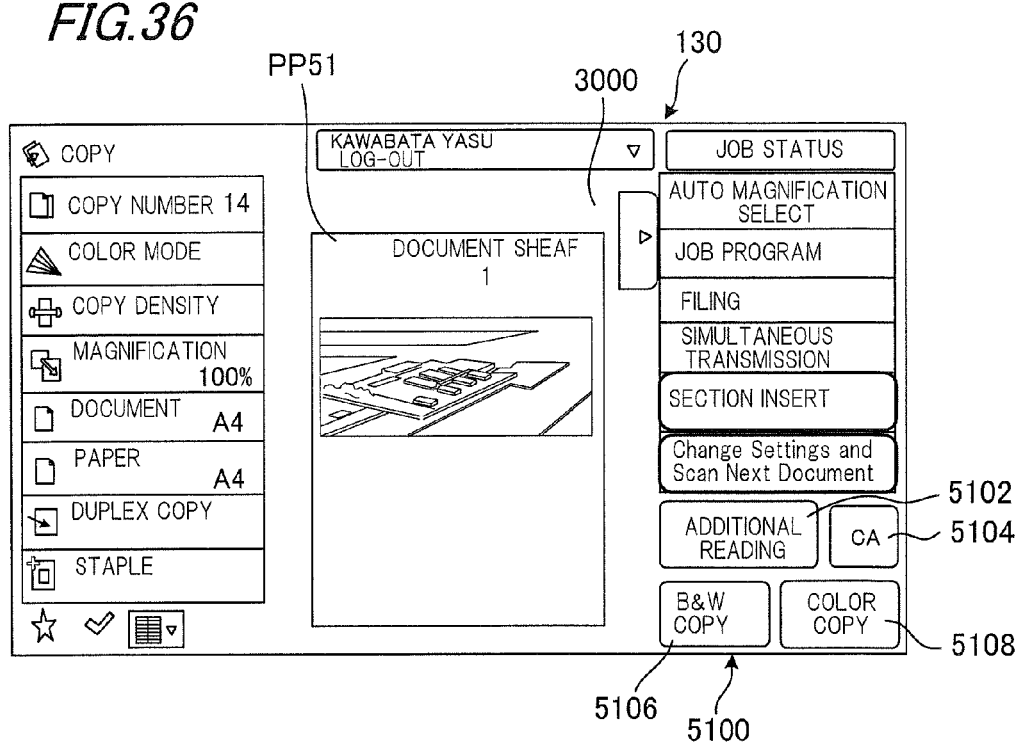
FIG. 36 is an illustrative view showing preview display of a document sheaf displayed on a touch panel display after a document reading operation in an image forming apparatus of example 5.
Figure 37:
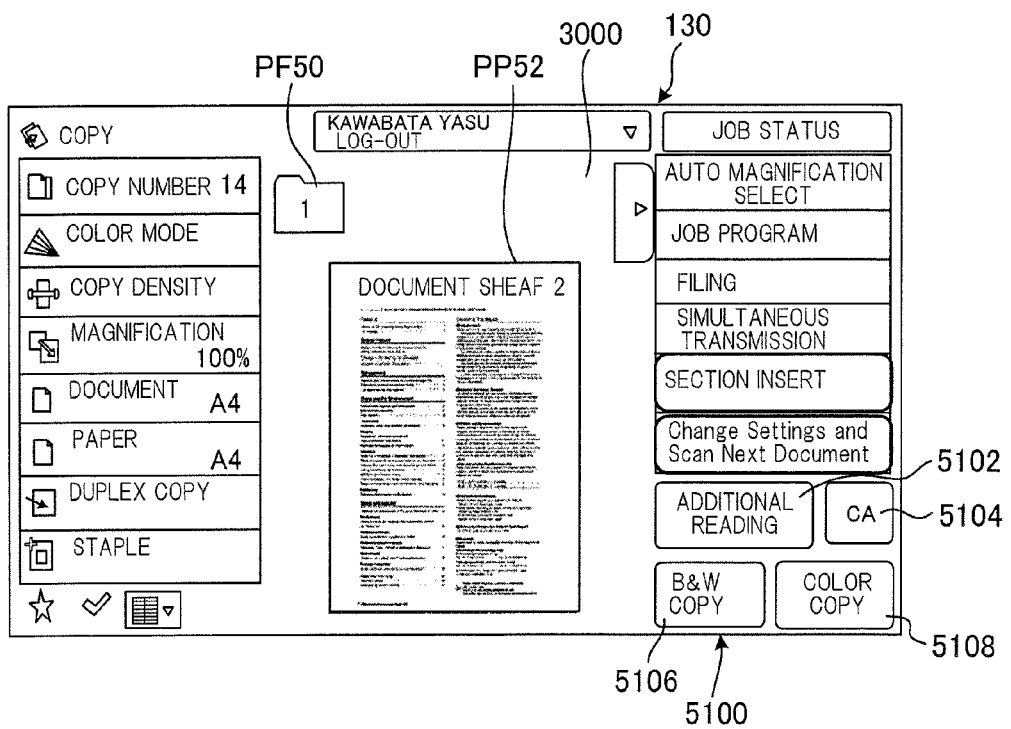
FIG. 37 is an illustrative view showing preview display of an additional document sheaf when additional reading operation is performed after a document reading operation in example 5.
Figure 38:
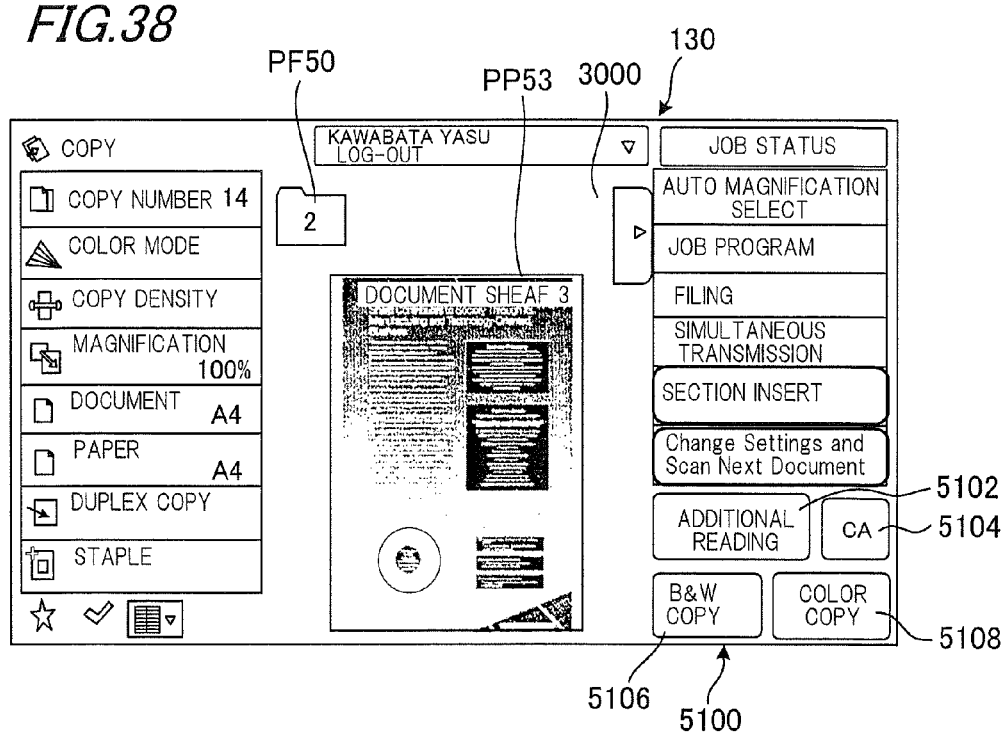
FIG. 38 is an illustrative view showing preview display of an additional document sheaf when a further additional reading operation is performed in example 5.

FIG. 36 is an illustrative view showing preview display of a document sheaf displayed on the touch panel display after a document reading operation in the image forming apparatus of example 5. FIG. 37 is an illustrative view showing preview display of an additional document sheaf when an additional reading operation was performed after a document reading operation in example 5. FIG. 38 is an illustrative view showing preview display of an additional document sheaf when a further additional reading operation was performed in example 5.

As the user touches scan-in key 5102 to implement scanning of documents by means of document reader 102, a display image of a document sheaf of multiple documents based on the image data of the scanned multiple documents is generated by display image generator 137, so that the whole area of the front page of a first document sheaf image PP51 is displayed in the center of preview region 3000, as shown in FIG. 36. At this time, the image information on the whole area of the front page of the scanned documents is displayed on the first document sheaf image PP51.

Next, when the user touches scan-in key 5102 to implement an additional reading operation, a second document sheaf image (additional document sheaf image) PP52 is generated by display image generator 137 as shown in FIG. 37, based on the image data of additionally scanned, multiple documents and the whole area of the front page is displayed in preview region 3000. On the other hand, a folder PF50 is prepared by folder preparation controller 1314 is displayed instead of first document sheaf PP51. The folder PF50 is displayed at a position upper left of second document sheaf PP52 in a size smaller than the first document sheaf image PP51. The folder PF50 stores first document sheaf PP51.

When a further additional reading operation is executed by the user touching scan-in key 5102, a third document sheaf image (additional document sheaf image) PP53 is generated by display image generator 137 as shown in FIG. 38, based on the image data of additionally scanned, multiple documents and the whole area of the front page is displayed in preview region 3000. On the other hand, the second document sheaf PP52 is stored in folder PF50, similarly to first document sheaf PP51.

In this way, documents were scanned by document reader 102, and every time additional documents are scanned by document reader 102, a document sheaf image is generated and only the image of the last document sheaf that has been additionally scanned is displayed such that the whole area of the front page is given in a preview representation in preview region 3000 while the previously scanned document sheaves are successively stored into folder PF50. With this, it is possible to distinguish the latest additionally scanned document sheaf from the others.

Here, the folder PF50 given in a preview representation may be displayed with folder information such as the number of document sheaves stored therein and the like. In example 5, when folder PF50 is storing first document sheaf PP51, "1" is noted as shown in FIG. 37. When folder PF50 is storing two document shaves, e.g., first document sheaf PP51 and second document sheaf PP52, "2" is noted as shown in FIG. 38.

Next description will be made on a case where one of the document sheaves scanned by document reader 102 is selected from folder PF50 and displayed in preview region 3000.

Figure 39:
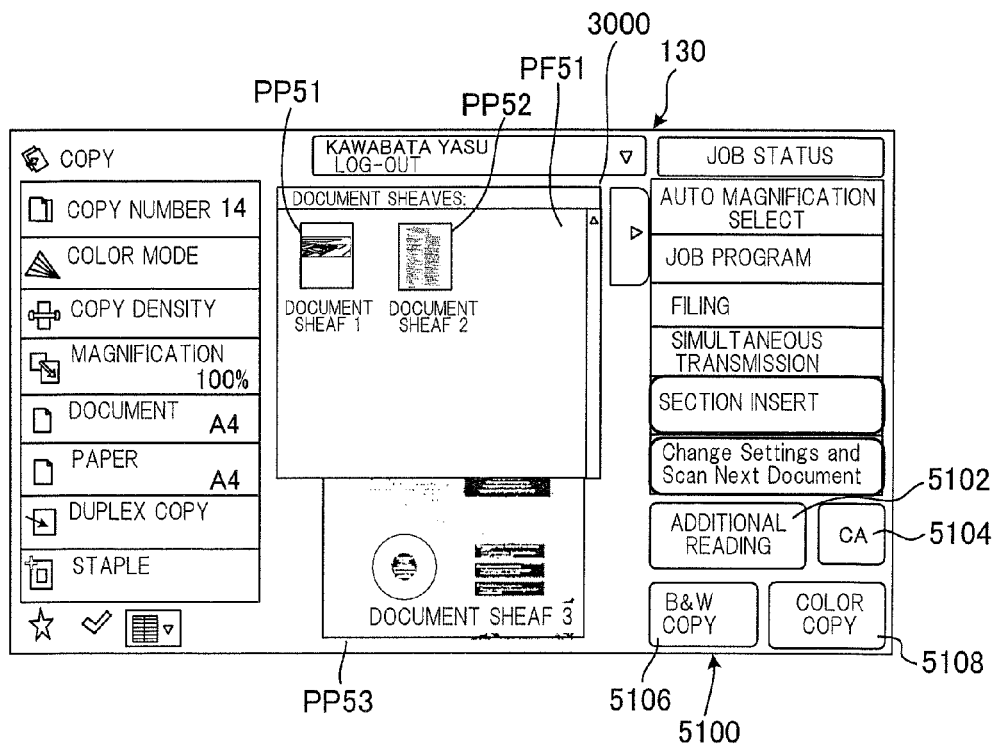
FIG. 39 is an illustrative view showing one example in which the interior of a folder is preview-displayed on a touch panel display in an image forming apparatus of example 5.
Figure 40:
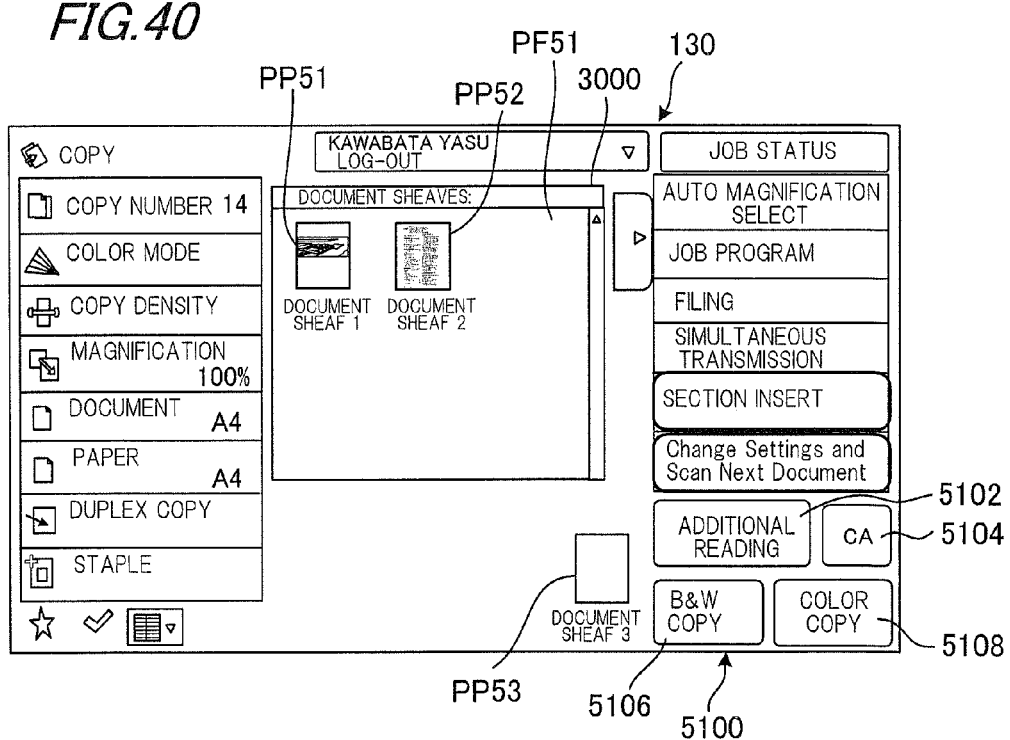
FIG. 40 is an illustrative view showing another example of preview display given on the touch panel display.
Figure 41:
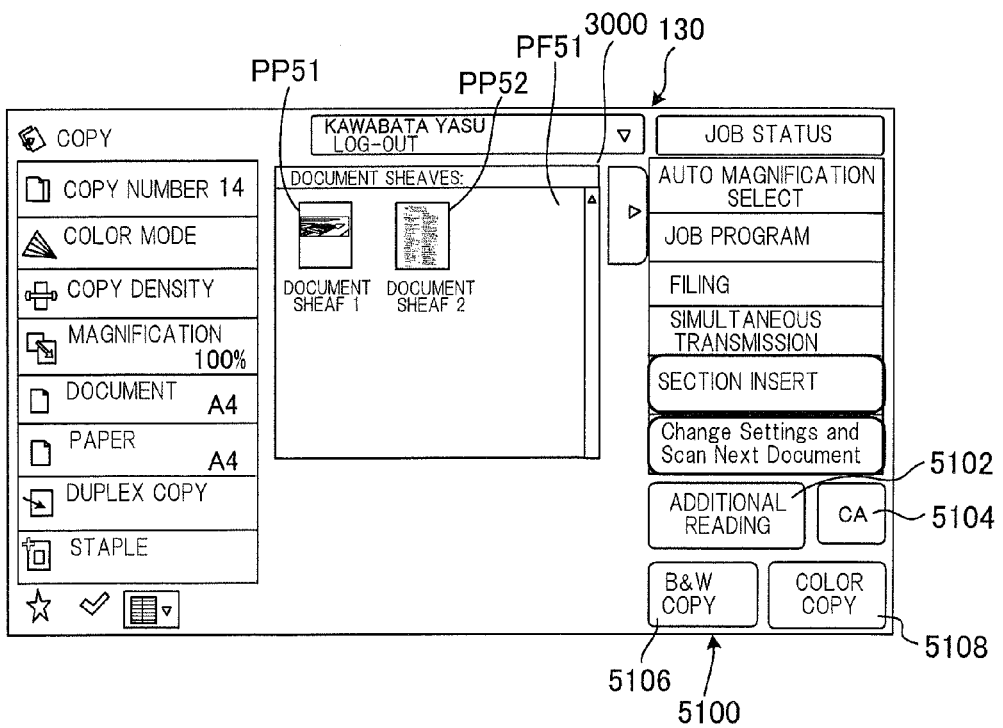
FIG. 41 is an illustrative view showing an example in which only a folder is displayed on the touch panel display.
Figure 42:
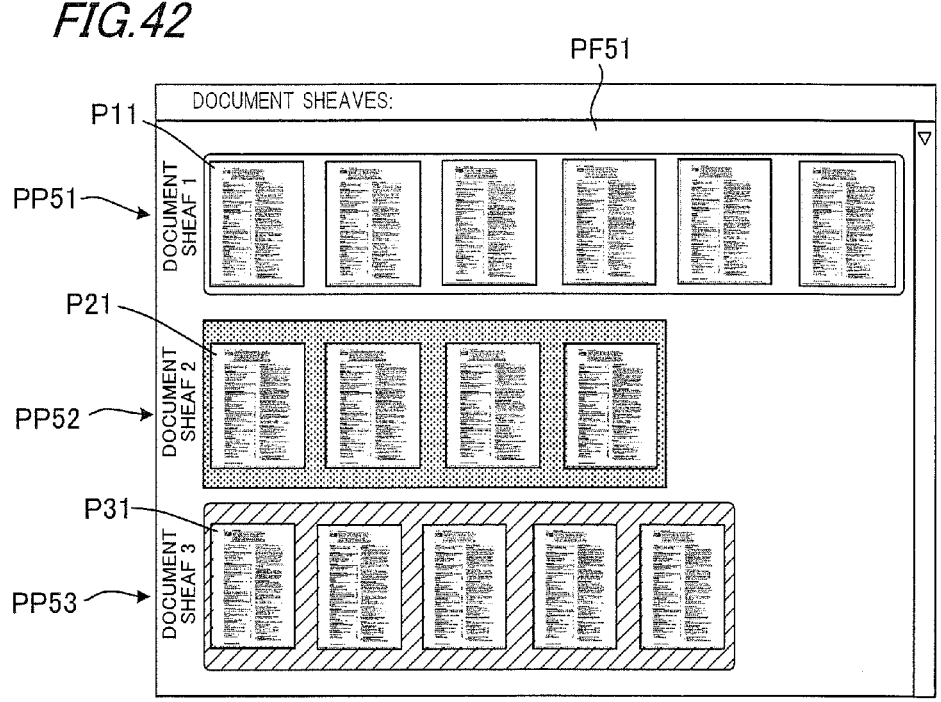
FIG. 42 is an illustrative view showing one display example of the interior of a folder in example 5.

FIG. 39 is an illustrative view showing one example in which the interior of the folder is preview-displayed on the touch panel display in the image forming apparatus of example 5. FIG. 40 is an illustrative view showing another example of preview display given on the touch panel display. FIG. 41 is an illustrative view showing an example in which only a folder is displayed on the touch panel display. FIG. 42 is an illustrative view showing one display example of the interior of the folder in example 5.

In example 5, when a desired document sheaf is displayed from a plurality of document sheaves inside folder PF50, the user touches folder PF50 first to open the folder and selects a desired document sheaf in folder PF50.

As the user touches folder PF50 in the state shown in FIG. 38, a document sheaf list PF51, which is the open mode of folder PF50, is displayed in front, hiding part of the third document sheaf PP53 as shown in FIG. 39.

Here, two icons representing document sheaves, i.e., first document sheaf PP51 and second document sheaf PP52 stored therein are displayed in document sheaf list PF51. Though, in this case, the icon is displayed by reducing the whole area of the front page of each of first and second document sheaves PP51 and PP52 to fit the size of the icon, the present invention should not be limited to this.

As another display example of document sheaf list PF51, as shown in FIG. 40, when folder PF50 is opened to display document sheaf list PF51, the third document sheaf PP53 is reduced in size and displayed at a position lower right of document sheaf list PF51.

As another display example of document sheaf list PF51, as shown in FIG. 41, when folder PF50 is opened to display document sheaf list PF51, the document sheaf list PF51 alone may be displayed on preview region 3000 while the third document sheaf PP53 may be omitted.

It is also possible to provide a display style inside document sheaf list PF51, in which, for example, multiple documents included in first document sheaf PP51, second document sheaf PP52 and third document sheaf PP53 are arrayed and displayed in a row for each sheaf, as shown in FIG. 42. It is also possible to change color for the display area of every document sheaf, first document sheaf P951, second document sheaf PP52 or third document sheaf PP53 so as to be readily understandable. Reference numerals P11 . . . , P21 . . . , P31 . . . denote documents.

Next description will be made on a case where a desired document sheaf is selected from folder PF50 and displayed.

Figure 43:
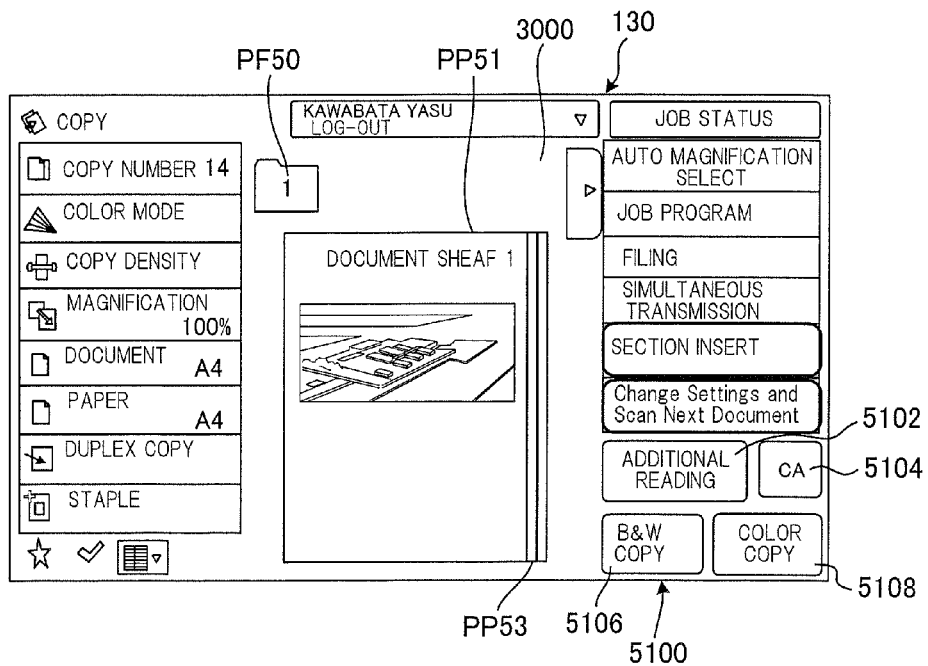
FIG. 43 is an illustrative view showing one example in which a desired document sheaf is selected from the interior of a folder and displayed on a touch panel display in example 5.
Figure 44:
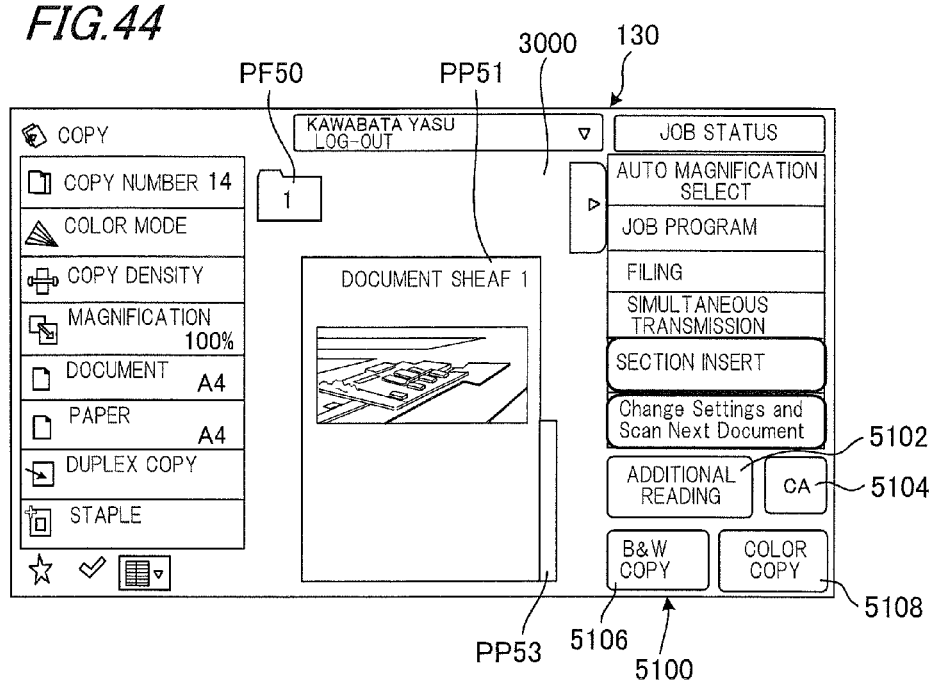
FIG. 44 is an illustrative view showing another example of document sheaves being displayed on the touch panel display.
Figure 45:
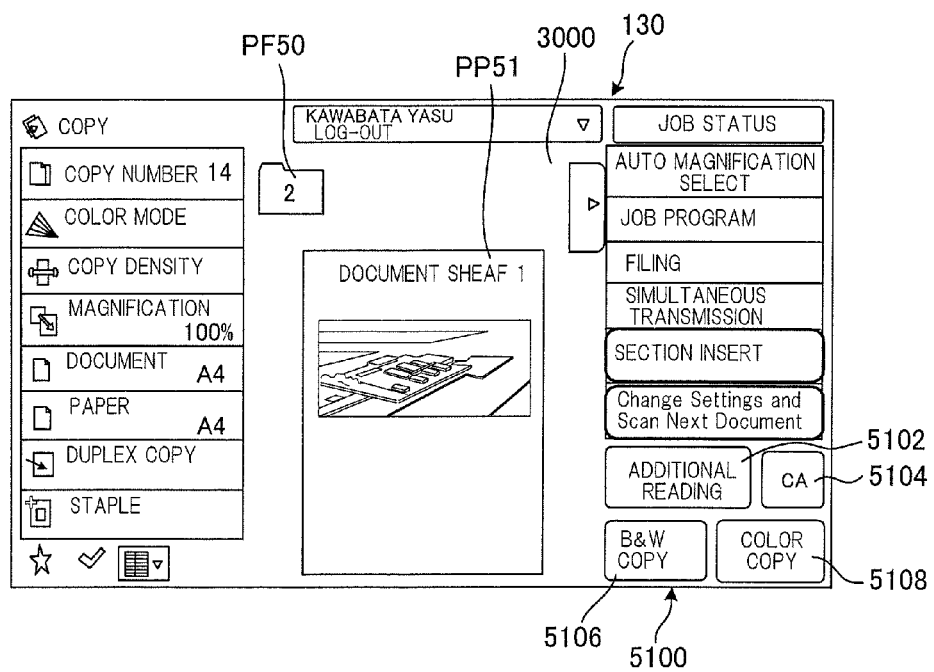
FIG. 45 is an illustrative view showing another example of document sheaves being displayed on the touch panel display; and, FIG. 46 is an illustrative view showing an example in which only a document sheaf selected on the touch panel display is displayed.
Figure 46:
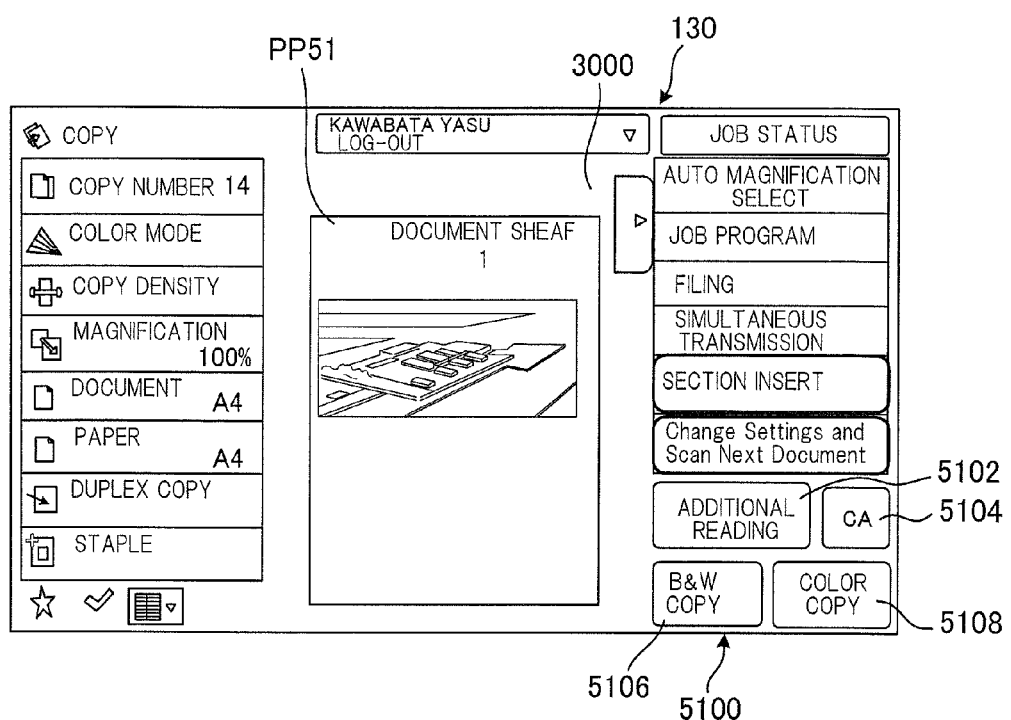

FIG. 43 is an illustrative view showing one example in which a desired document sheaf is selected from the interior of the folder and displayed on the touch panel display in example 5. FIGS. 44 and 45 are illustrative views showing other examples of document sheaves displayed on the touch panel display. FIG. 46 is an illustrative view showing an example in which only a document sheaf selected on the touch panel display is displayed.

In example 5, when a desired document sheaf is displayed on touch panel display 130, the user touches a desired document sheaf image from the multiple document sheaves inside folder PF50. The touched document sheaf is enlarged to be a normal document sheaf image and displayed on touch panel display 130.

For example, when first document sheaf PP51 is displayed from the state shown in FIG. 42, the user touches small-sized, first document sheaf image PP51 displayed in document sheaf list PF51 or the open mode of folder PF50. Then, the whole area of the front page of first document sheaf PP51 is enlarged on touch panel display 130 and displayed over, and in front of the third document sheaf PP53, as shown in FIG. 43.

As another display example, when first document sheaf image PP51 is displayed, the third document sheaf image PP53 may be reduced and moved to the lower right behind first document sheaf image PP51 with part of the third document image exposed from first document sheaf image PP51, as shown in FIG. 44.

As a further display example, when first document sheaf image PP51 is displayed, folder PF 50 and first document sheaf PP51 alone may be displayed on preview region 3000 with the third document sheaf image PP53 omitted, as shown in FIG. 45.

As still another display example, as shown in FIG. 46, first document sheaf image PP51 alone may be displayed in the normal size or in an enlarged size on preview region 3000 with folder PF50 and other document sheaves omitted.

As described heretofore, in image forming apparatus 100 including control unit 120 having touch panel display 130 of the present embodiment, display image generator 137 of touch panel display 130 has the function of forming display images of document sheaves based on the image data of multiple documents stored in storage 105 while control unit-side controller 131 for controlling control unit 120 includes document-sheaf display controller 1311, small-sized image preparation controller 1312, small-sized image display controller 1313, folder preparation controller 1314, folder storage controller 1315 and folder display controller 1316.

With the above configuration, it is possible to provide preview display of both the display image of a previously scanned document sheaf based on the image of documents that were scanned before an additional document scanning operation and the display image of an additional document sheaf based on the image data of documents that were additionally scanned, on the same display panel 132 in a distinctive manner, so that the user can recognize multiple document sheaves without switching the display screen on display panel 132. Further, the user can readily identify the desired document sheaf, and besides the user is able to check correlation between document sheaves so as to easily grasp the overall picture of the scanned documents.

The above embodiment and examples were described taking examples in which control unit 120 is applied to image forming apparatus 100 shown in FIG. 1. However, as long as it is an image forming apparatus that includes a control unit capable of presenting document images in preview representation on the display panel or the like before printing, the invention can be developed to any other image forming apparatus and the like, not limited to the image forming apparatus and copier having the configuration described above.

Though the above embodiment and examples were described taking cases where the document size of the previously scanned document sheaf is the same as the document size of the additional document sheaf, it goes without saying that these document sizes may be different from each other. Even in the case where the document size of the previously scanned document sheaf is different from the document size of the additional document sheaf, it is possible to display the previously scanned document sheaf image and the additional document sheaf image in the same size with each other with respect to the predetermined reference directions. It is also possible to display the previously scanned document sheaf image and the additional document sheaf image in different sizes with respect to the predetermined reference directions, in conformity with the document size ratio.

Having described heretofore, the present invention is not limited to the above embodiment and examples, various changes can be made within the scope of the appended claims. That is, it is apparent that various kinds of variations and modified examples will occur to those skilled in the art within the scope of the appended claims. That is, any embodied mode obtained by combination of technical means modified as appropriate without departing from the spirit and scope of the present invention should be included in the technical art of the present invention.

What is claimed is:

1. An image forming apparatus comprising:
an input unit receiving input of image data;
a storing unit storing the image data input from the input unit;
a display image generator generating a display image based on the image data stored in the storing unit;
a display portion having a display screen for displaying the display image generated by the display image generator; and
a display controller having a function of providing preview display of the display image on the display portion, based on the image data input from the input unit,
characterized in that:
the input unit has a function of receiving additional input of new image data, after the image data is input;
the display image generator has a function of separately generating a first display image based on precedent image data input before additional input and stored in the storing unit and a second display image based on additional image data that is additionally input; and
the display controller as a function of providing preview display of the first display image and the second display image, on the same display screen of the display portion, in a distinctive manner, when the new image data is additionally input, and a function of displaying the second display image in an overlapping manner behind the first display image.

2. An image forming apparatus comprising:
an input unit receiving input of image data;
a storing unit storing the image data input from the input unit;
a display image generator generating a display image based on the image data stored in the storing unit;
a display portion having a display screen for displaying the display image generated by the display image generator; and
a display controller having a function of providing preview display of the display image on the display portion, based on the image data input from the input unit,
characterized in that:
the input unit has a function of receiving additional input of new image data, after the image data is input;
the display image generator has a function of separately generating a first display image based on precedent image data input before additional input and stored in the storing unit and a second display image based on additional image data that is additionally input; and
the display controller as a function of providing preview display of the first display image and the second display image, on the same display screen of the display portion, in a distinctive manner, when the new image data is additionally input, and a function of displaying the second display image in an overlapping manner in front of the first display image.

3. An image forming apparatus comprising:
an input unit receiving input of image data;
a storing unit storing the image data input from the input unit;
a display image generator generating a display image based on the image data stored in the storing unit;
a display portion having a display screen for displaying the display image generated by the display image generator; and
a display controller having a function of providing preview display of the display image on the display portion, based on the image data input from the input unit,
characterized in that:
the input unit has a function of receiving additional input of new image data, after the image data is input;
the display image generator has a function of separately generating a first display image based on precedent image data input before additional input and stored in the storing unit and a second display image based on additional image data that is additionally input; and
the display controller has a function of providing preview display of the first display image and the second display image, on the same display screen of the display portion, in a distinctive manner, when the new image data is additionally input, a function of preparing the first display image that is reduced in size as a first small-sized image picture and a function of displaying the first small-sized image picture around the second display image that is given in a preview representation on the display screen of the display portion.

* * * * *